United States Patent
Bilde

(10) Patent No.: US 10,257,983 B2
(45) Date of Patent: Apr. 16, 2019

(54) CROP PROCESSING APPARATUS IN A COMBINE HARVESTER

(71) Applicant: AGCO International GmbH, Hesston, KS (US)

(72) Inventor: Morten Leth Bilde, Langaa (DK)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/533,676

(22) PCT Filed: Dec. 15, 2015

(86) PCT No.: PCT/EP2015/079769
§ 371 (c)(1),
(2) Date: Jun. 7, 2017

(87) PCT Pub. No.: WO2016/096839
PCT Pub. Date: Jun. 23, 2016

(65) Prior Publication Data
US 2017/0332554 A1    Nov. 23, 2017

(30) Foreign Application Priority Data

Dec. 17, 2014 (GB) .................................... 1422456.2
Dec. 17, 2014 (GB) .................................... 1422459.6

(51) Int. Cl.
*A01F 12/44* (2006.01)
*A01F 12/46* (2006.01)
*A01F 12/48* (2006.01)

(52) U.S. Cl.
CPC ............ *A01F 12/444* (2013.01); *A01F 12/44* (2013.01); *A01F 12/46* (2013.01); *A01F 12/48* (2013.01); *A01F 12/446* (2013.01)

(58) Field of Classification Search
CPC .... A01F 7/06; A01F 7/067; A01F 7/00; A01F 12/442; A01F 12/44; A01F 12/56;
(Continued)

(56) References Cited

U.S. PATENT DOCUMENTS 1,402,068 A    1/1922   Himmel
2,694,493 A   11/1954   Odegarden
(Continued)

FOREIGN PATENT DOCUMENTS

DE    12 86235 B    1/1969
DE    38 23 115 A1  1/1990
(Continued)

OTHER PUBLICATIONS

UK Intellectual Property Office, International Search Report for 1st Priority Document Application No. GB1422456.2, dated Jun. 12, 2015.
(Continued)

*Primary Examiner* — Robert E Pezzuto

(57) ABSTRACT

A combine harvester includes a grain pan arranged to catch a crop stream, the grain pan being driven in an oscillating manner to convey the crop stream rearwardly to a rear edge. A cleaning unit includes a fan for generating a cleaning airstream which is directed under the rear edge. The grain pan includes a floor profile which defines a transverse profile having ridges and troughs. The troughs provide a plurality of longitudinal channels, wherein the ridge-to-trough height increases in the direction of conveyance. Crop material conveyed by the grain pan experiences channels that deepen towards the rear edge of the pan.

25 Claims, 20 Drawing Sheets

(58) Field of Classification Search
CPC ...... A01F 12/446; A01F 12/46; A01F 12/444; A01F 12/30; A01F 12/48
USPC .... 460/66, 67, 80, 81, 85, 90, 98, 100, 101; 56/14.6
See application file for complete search history.

(56) References Cited

U.S. PATENT DOCUMENTS

| | | | |
|---|---|---|---|
| 4,078,571 A | | 3/1978 | Todd et al. |
| 4,208,858 A | * | 6/1980 | Rowland-Hill ........... A01F 7/06 460/100 |
| 5,791,986 A | * | 8/1998 | Underwood ............ A01F 12/44 460/101 |
| 6,056,639 A | * | 5/2000 | Gryspeerdt ............. A01F 12/44 460/101 |
| 9,854,742 B2 | * | 1/2018 | Bilde ...................... A01F 12/44 |

FOREIGN PATENT DOCUMENTS

| | | |
|---|---|---|
| DE | 10 2011 001864 A | 10/2012 |
| EP | 0 077 416 A | 4/1983 |
| EP | 0545914 A | 6/1993 |
| EP | 2 740 347 A | 6/2014 |
| JP | H06113663 A | 4/1994 |
| JP | H08168316 A | 7/1996 |
| WO | 89/11215 A | 11/1989 |
| WO | 2012/095239 A | 7/2012 |
| WO | 2014/082890 A1 | 6/2014 |

OTHER PUBLICATIONS

UK Intellectual Property Office, International Search Report for 2nd Priority Document Application No. GB1422459.6, dated Jun. 11, 2015.

European Patent Office, International Search Report for parent International Patent Application No. PCT/EP2015/079769, dated Mar. 10, 2016.

* cited by examiner

CROP PROCESSING APPARATUS IN A COMBINE HARVESTER

FIELD OF INVENTION

The invention relates to combine harvesters and particularly to systems for transferring crop material from threshing and separating apparatus to a grain cleaning unit. More specifically the invention relates to conveyance systems which include grain pans arranged to catch a crop stream, the grain pans being driven in an oscillating manner to convey the crop stream rearwardly to a grain cleaning unit.

BACKGROUND

The process for cleaning grain in combine harvesters has not changed fundamentally for many decades. The cleaning unit, or 'shoe', has directed therethrough a cleaning airstream which is typically generated by a cross-flow or centrifugal fan located in front of the cleaning shoe. As a mix of grain kernels, chaff, tailings and straw is passed over one or more oscillating sieves, the cleaning airstream serves to blow the lighter material in a generally rearward direction over the sieves and out of the rear of the machine. The grain is generally heavier and/or smaller than the material other than grain (MOG) in the mix and passes through the sieves.

The cleaning shoe is most efficient when the grain is caused to settle on the uppermost sieve (hereinafter referred to as the chaffer) as early as possible and the lighter material is kept airborne. If the grain bounces on impact with the chaffer then the risk of the cleaning airstream carrying the grain out of the rear of the shoe increases. The speed of the cleaning airstream is typically selected to strike a balance between grain cleanliness and acceptable loss. Ultimately, this balance creates a limit on the capacity of the cleaning unit. In other words, without an increase in shoe size, any increase in capacity will adversely affect grain cleanliness and/or loss rate.

However, despite these limits, there remains a continuing drive to increase the size and capacity of combine harvesters to meet the needs of modern farmers and to speed up the overall harvesting process. As outlined above, increasing the throughput of the cleaning shoe with known technology requires an increase in the physical size. For example, increasing the width of the cleaning shoe would deliver an increased machine capacity but at the cost of increased machine width. However, maximum machine width is limited by road transport legislation in some countries thus rendering this option unattractive. In a similar vein, increasing the length of the chaffer would require an increase in wheel base and a consequential increase in turn radius which is undesirable to farmers.

Efforts to increase the capacity of the cleaning shoe based on pre-stratification of the crop stream have been made. For example, WO-2012/095239 discloses a combine harvester having an extended return pan which catches separated crop material from overhead threshing and separating apparatus and conveys such to a front edge from where it drops on to a grain pan, the grain pan conveying the crop mix rearwardly to a rear edge from where it falls into the cleaning shoe. In this disclosure, the return pan is of an extended construction to deliver the majority of the separated material to the front of the grain pan to facilitate enhanced stratification of the material before delivery to the cleaning shoe. As disclosed therein, the recognised advantage that the grain rich bottom layer falls directly onto the chaffer whereas the upper MOG-rich layer is rendered airborne by the cleaning airstream.

The desire for combine harvesters of larger capacity maintains the drive for more efficient grain cleaning systems.

SUMMARY OF INVENTION

It is therefore an object of the invention to provide a combine harvester with increased capacity without the need to extend the size of the cleaning unit.

It is a further object of the invention to optimise the delivery of the crop material to the cleaning shoe to increase the separating effect of the cleaning airstream.

It is yet a further object of the invention to enhance the stratification of crop material on a grain pan upstream of the cleaning shoe.

In accordance with a first aspect of the invention there is provided a combine harvester comprising a grain pan arranged to catch a crop stream, the grain pan being driven in an oscillating manner to convey the crop stream rearwardly to a rear edge. A cleaning unit is provided and comprises a fan for generating a cleaning airstream which is directed under the rear edge of the grain pan. The grain pan comprises a conveyance floor with a floor profile which defines a transverse profile comprising ridges and troughs, the troughs providing a plurality of longitudinal channels. The ridge-to-trough height preferably increases in the direction of conveyance.

The invention serves to funnel or focus the heavier grain-rich crop material into a plurality of discrete streams which fall over the rear edge of the grain pan. In between the channels a series of ridges (or peaks) that rise in the direction of conveyance (with respect to the troughs) serve to elevate or lift the upper MOG-rich layer and effectively vertically stretch or further separate the stratified layers upstream of the cleaning shoe, and in particular of the cleaning airstream passing under the rear edge of the pan.

The invention also involves the recognition that an evenly spread, albeit stratified, layer of crop material falling over the rear edge of the grain pan suffers in that the cleaning airstream passing under the edge thereof must pass through the relatively dense grain-rich layer to engage and lift the lighter MOG. By funneling the grain-rich bottom layer into a number of spaced discrete streams, gaps between the streams permit unobstructed passages (or vents) for the cleaning airstream to impact the lighter MOG-rich material. In combination with this the ridges lift the MOG upstream of the rear edge thus enhancing the spatial separation from the grain even before entering the cleaning shoe.

The ridge and trough profile is preferably mimicked on the underside of the pan so as to influence the air profile. In other words, the profile of the pan floor is evident from the underside also. The profile of the pan minimizes or eliminates the airflow below the troughs while increasing the height and thereby air flow below the ridges. Increasing the total air flow (typically but not exclusive by increasing the rotation speed of the fan) will primarily increase the air flow below the ridges and only to a lower extent below the troughs. Differentiating the grain, MOG and air distribution across the width of the cleaning system in this manner allows for a higher total air flow to be employed without increasing the losses. In turn, this allows for an increase in the capacity of the cleaning system without increasing the spatial envelope required.

In a preferred embodiment the ridges are mutually spaced in a row across the width of the grain pan. The ridges may widen in the direction of conveyance, therefore narrowing the profile of the channels in-between. As the crop material is conveyed rearwardly by the oscillating grain pan the lighter upper layers are forced upwardly by the narrowing channels and the incline of the adjacent ridges.

The grain pan is may be provided with structure which comprises a plurality of longitudinal upstanding fins serving to divide the channels from one another. Such dividing fins or baffles are well-known on existing machines and serve primarily to maintain an even distribution of the crop material across the width of the grain pan even when operating on side banks. The fins may serve as a course means to maintain the longer crop material (mainly straw) above the grain-rich lower layers to enhance stratification. In this regard the fins preferably comprise an upper edge having a saw-toothed profile which may be unsymmetrical so as to be aggressive in the rearwardly direction.

In a preferred embodiment the ridge-to-trough height is greatest adjacent the rear edge. Advantageously, the majority of the grain pan length is utilised for stratification of the crop material mix, the stratified layers being subjected to the more pronounced channels upstream of the cleaning shoe. The ridge-to-trough height preferably increases continuously in the direction of conveyance so as to provide a smooth movement transition for the material conveyed over the surface thereof.

The rear edge is preferably continuous and is longer than the width of the grain pan. A conventional grain pan has a straight rear edge for discharging the crop material. A grain pan in accordance with certain aspects of the invention has a rear edge having a non-straight profile so as to increase the length thereof and effectively enlarge the zone along which the cleaning airstream is introduced to the crop material as it comes off of the grain pan. The increase in length of the rear edge can is achieved without the need to increase the width of the pan, thus increasing throughput capacity whilst remaining within the width envelope defined by the combine harvester frame.

In a preferred embodiment the grain pan floor comprises a downwardly sloping section. More preferably the grain pan floor comprises an upwardly sloping section upstream of a downwardly sloping section.

It should be understood to those skilled in the art that upwardly and downwardly sloping is relative to a horizontal plane within the combine harvester, the horizontal plane being affected by driving across slopes and up and down hills. With regard to the "upwardly" and "downwardly" sloping section of the grain pan it should be understood that these terms are made with reference to the direction of conveyance primarily on a fore-and-aft axis.

The channels are preferably disposed on such a downwardly sloping section so that the rearward progression of the grain-rich lower layers is aided by gravity. The downward movement of the grain-rich lower layers enhances the vertical 'stretching' or enhanced stratification of the layers of material and minimises the blocking action of the ridges that rise up in the direction of conveyance. Furthermore, the increase in the vertical dimension of the channels provides more space for the crop material stream to pass through.

The grain pan floor preferably comprises a rippled or transversely corrugated saw-toothed profile as is known in existing grain pans to aid rearward conveyance of the crop material as the pan is driven oscillation. Moreover, portions of the conveyance floor that include the ridges and troughs may also comprise a rippled surface. It should be understood that the grain pan is driven with reciprocal or oscillatory motion in a path of movement which may be linear in the fore-and-aft direction or more circular without departing from the scope of the invention.

In one embodiment the ridge and trough profile is provided in a rear portion of the floor profile, wherein a front portion of the floor profile is substantially planar notwithstanding any rippled surface structure. Alternatively, the longitudinal channels may extend for the entire length of the grain pan from a front edge of the grain pan to the rear edge.

The profile of ridges and troughs in accordance with the invention may adopt various different geometries without departing from the scope of the invention. The pitch of the ridge and trough profile may remain substantially the same in the direction of conveyance whilst the amplitude increases thus defining channels that deepen towards the rear edge. For example, the floor profile may define a plurality of ramps corresponding to said ridges, the ramps being disposed on a generally planar structure and having an increasing height in the direction of conveyance so as to form channels that deepen, with respect to the ridges in the direction of conveyance.

The base of the ramps may also widen in the direction of conveyance so as to narrow the channels towards the rear edge. Moreover, the ridges may narrow towards the rear edge of the pan. It should be understood that the concept of rising ridges and deepening troughs in the direction of conveyance is defined in relative terms. For example, a ridge or ramp having a height that increases in the direction of conveyance may be horizontal or even slope downwardly because the increasing "height" is relative to the base of the adjacent troughs. Similarly, the increasing depth of the troughs (alternatively termed channels, gullies or valleys) is relative to the adjacent ridges.

A ramp having a generally tetrahedron-shaped profile delivers certain advantages including ease of manufacture for example. Such tetrahedron-shaped ramps can be simply formed by a pair of triangular side plates which are joined together to form an upstream pointing wedge with narrowing channels formed between. The edge along which the side plates join form a ridge having a height that increases in the direction of conveyance. To further enhance the rearward and upward conveyance of the crop material by the ramps, they may be provided with a transversely corrugated saw-toothed, or rippled, profile in a similar manner to the floor of the grain pan.

The trough and ridge profile may be shaped as a waveform or a regular pattern extending across the width of the pan. The trough and ridge profile may be curved, for example, sinusoidal. Alternatively, and by way of example only, the troughs may be U-shaped.

The troughs may comprise a part-conical profile so as to present a deepening valley and a channel with increased sectional area, with respect to the ridges, in the direction of conveyance.

The width of the ridges may taper outwardly so as to overhang adjacent troughs. For example, the ridges may comprise a generally omega-shaped or mushroom-shaped profiles. Advantageously, the sectional area of the space under the ridges increases with height which allows more air to be directed to the MOG-rich layer of material lifted thereby. Also, the overhanging ridges has been shown to roll the MOG over and enhance stratification.

In accordance with a second aspect of the invention there is provided a combine harvester comprising:

a grain pan arranged to catch a crop stream, the grain pan being driven in an oscillating manner to convey the crop stream rearwardly to a rear edge;

a cleaning unit comprising a fan for generating a cleaning airstream which is directed under the rear edge;

a plurality of upstanding nozzles disposed on the grain pan, the nozzles directing pressurised air in a rearward direction at a height above the pan floor.

By directing air rearwardly from a source above the grain pan floor, lifting of the lighter MOG-rich top layer of material is enhanced, even before reaching the cleaning shoe. Furthermore, the heavier, grain-rich bottom layer of material is 'insulated' from this upper airflow thus minimising grain loss.

Preferably, the nozzles each comprise a rearward facing vent.

It should be understood that the term "nozzle" is employed broadly to mean physical structure for directing or focussing an airstream in a given direction. Moreover, the term "vent" is used for the ejection part of the nozzle. By way of example, the nozzle may comprise a simple hollow structure which is open on the rear side. It should also be understood that, in this regard, the "pan floor" is taken as the base of the troughs and that the air is vented above this level.

Baffles may be provided inside the nozzles, the baffles being configured to create zones of higher velocity airflow and zones of lower velocity airflow immediately behind, or downstream of, the nozzles. In a preferred embodiment of the second aspect, each nozzle is configured to vent the pressurised air with a higher velocity exit airflow at the top than at the bottom of the nozzle structure. It has been recognised that the lighter top layers of crop material can be exposed to a higher velocity air flow without the increased risk of grain loss. Advantageously, therefore, the lighter MOG-rich material is propelled rearwardly at a greater speed, leaving the lower, grain-rich, layer less affected by the lower velocity airstream. Enhanced grain cleaning is thus provided without increased loss.

It shall be understood by the skilled person that, a preferred arrangement embodies both the first and second aspects of the invention wherein the ridges serve a dual purpose. Being upstanding above the pan floor, the nozzles can also serve as raised ridges or peaks which steer the lighter upper layers of material upwardly. This can be considered in reverse wherein the ridge and trough profile of the conveyance floor can accommodate nozzles within the ridges, either at the rear edge of the pan or spaced forwardly therefrom.

Not only do the ridges vertically stretch the layers of crop material but the nozzles provided therein provide a targeted cleaning airstream which affects only the lighter material rendering it airborne as it enters the chaffer area. This especially beneficial embodiment of the invention has been shown to significantly enhance the pre-stratification process ultimately increasing the available capacity of the overall cleaning system.

The nozzles may be integrated or moulded into the structure of the grain pan and may indeed be embodied in the structure of the ridges. A rear face of the ridge may be left open to provide a nozzle vent.

Side faces and/or top faces of the ridges or ramps may also comprise rearward facing vents to expel pressurised air to further enhance the separation of the lighter material from the bottom grain rich material. Experimental testing has shown that the upper MOG-rich layers are lifted by the inclined side walls of ridges and the further provision of nozzles in the side walls and/or the top surface significantly increases the desired effect of pre-separation.

The nozzles may vent the pressurised air forwardly of the rear edge above the conveyance floor. In such case, the fan and associated ducting may be configured to supply pressurised air to the nozzles (through openings in the conveyance floor) and under the rear edge.

The aforementioned aspects of the invention may be applied to one or both of a stratification pan and a cascade pan arranged downstream of the stratification pan. The inventive aspects lend themselves particularly well to a grain cleaning system having a cascade pan downstream of the grain pan. However, the invention can also be embodied in a combine harvester having no cascade pan wherein the crop flow passes directly from the grain pan onto the chaffer or upper sieve. In fact, the enhanced vertical separation of the stratified layers by the ridge and trough profile in combination with a cleaning airstream at a height above the grain pan may render the cascade pan unnecessary thus saving on components and increasing design flexibility with the height saving achieved.

In one embodiment the grain pan is a cascade pan located downstream, below and rearward of a stratification pan, wherein the stratification pan is driven in an oscillating manner to convey the crop stream rearwardly to a respective rear edge from where the crop stream falls onto the cascade pan. In another embodiment the grain pan is a cascade pan located downstream, below and rearward of a stratification pan, wherein the stratification pan is driven in an oscillating manner to convey the crop stream rearwardly to a respective rear edge from where the crop stream falls onto the cascade pan.

In yet another embodiment both a stratification pan and a cascade pan include a ridge and trough profile wherein the cascade pan comprises a respective conveyance floor with a floor profile which defines a transverse profile comprising ridges and troughs, the troughs of the cascade pan providing a plurality of longitudinal channels, wherein the ridge-to-trough height increases in the direction of conveyance. In this case, the transverse ridge and trough profile of the stratification pan may be substantially equal to the transverse ridge and trough profile of the cascade pan.

The invention lends itself to a combine harvester employing virtually any known type of threshing and separating apparatus. For example, the threshing and separating apparatus may be of the conventional type, a single or twin axial flow type, or a hybrid system. A return pan is preferably located under the threshing and separating apparatus so as to catch crop material falling therefrom and convey such forwardly to a front edge wherein the front edge is positioned above the grain pan and forwardly of the ramps. The return pan therefore delivers the crop material upstream of the ramps so that the latter can lift the lighter material as described above.

In another embodiment, two return pans are provided wherein a first pan is positioned under a front portion of the threshing and separating apparatus and a second return pan is positioned under a rear portion of the threshing and separating apparatus, wherein both return pans convey the collected material forwardly to respective front edges. An example of such a dual return pan arrangement is disclosed in WO-2015/062965, the contents of which are incorporated herein by reference.

BRIEF DESCRIPTION OF THE DRAWINGS

Further advantages of the invention will become apparent from reading the following description of specific embodiments with reference to the appended drawings in which.

DETAILED DESCRIPTION OF THE DRAWINGS

The invention will be described in connection with various preferred embodiments. Relative terms such as front, rear, forward, rearward, left, right, longitudinal and transverse will be made with reference to the longitudinal vehicle axis of a combine harvester travelling in the normal direction of travel. The terms "direction of conveyance", "upstream" and "downstream" are made with reference to the general flow of crop material through the combine harvester.

Figure 1:
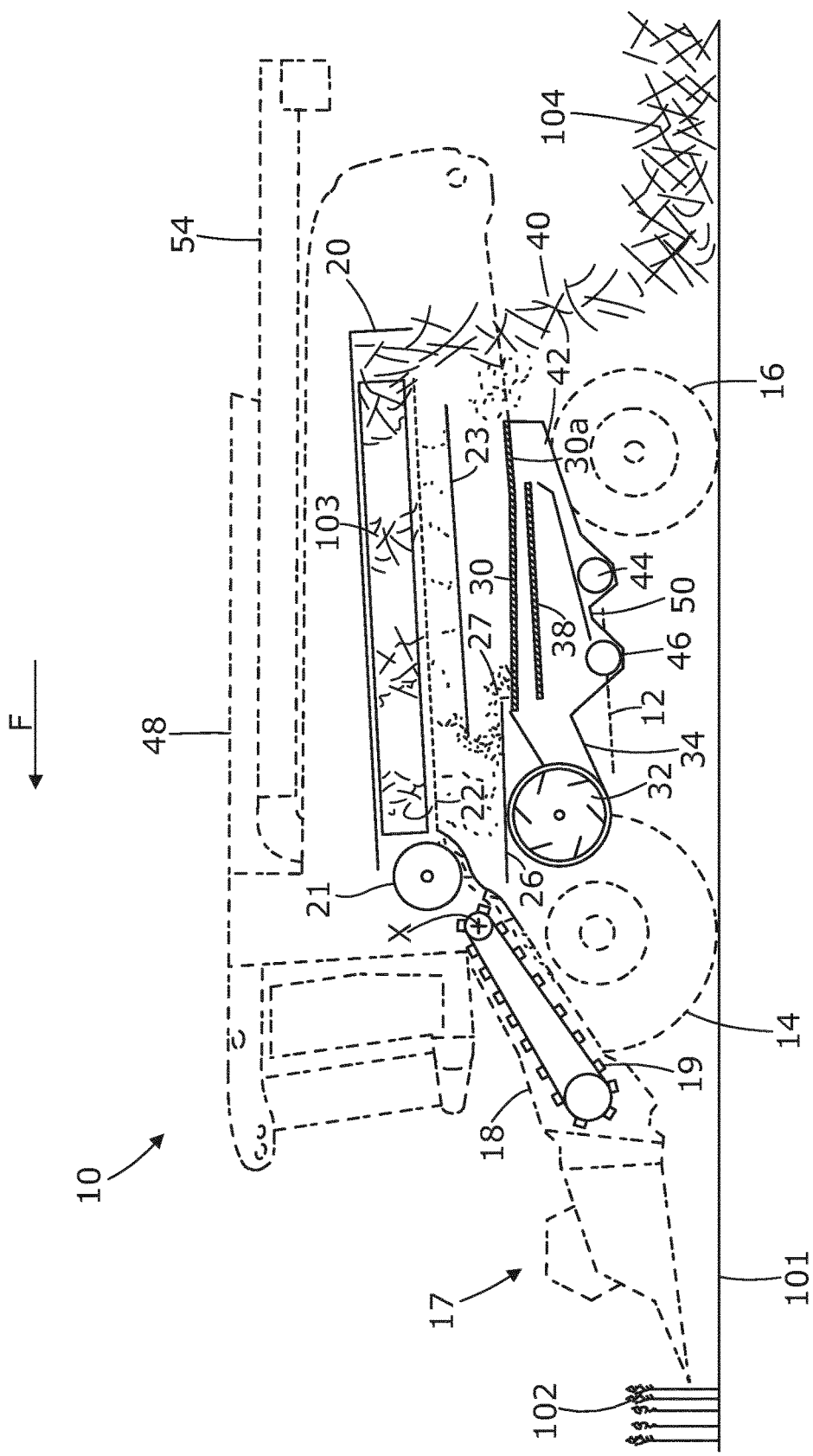
FIG. 1 is a schematic left side elevation view of a combine harvester with the inner workings revealed and having a crop material conveyance system suitable for embodying various aspects of the invention.

With reference to FIG. 1 a combine harvester 10 includes a frame 12, front wheels 14 and rear steerable wheels 16, the wheels engaging with the ground 101. A cutting header 17 is detachably supported on the front of a feederhouse 18 which is pivotable about a transverse axis 'X' to lift and lower the header 17 in a conventional manner.

The combine 10 is driven in a forward direction (arrow F) across a field of standing crop 102 in a known manner. The header 17 serves to cut and gather the crop material before conveying such in to feederhouse 18 and the elevator 19 housed therein.

At this stage the crop stream is unprocessed. It should be understood that combine harvesters are employed to harvest a host of different crops including cereal, rice, corn and grass seed. The following description will make reference to various parts of a cereal crop stream but it should be understood that this is by way of example only and does not by any means limit the applicability of the invention to harvesting other harvested crops.

The cut crop stream is conveyed rearwardly from the feederhouse 18 to a processor designated generally at 20. The processor 20 of the illustrated combine includes an axial flow threshing and separating rotor which is fed at its front end by a feed beater 21. Axial flow rotor 20 serves to thresh the crop stream in a front region, separate the grain therefrom in a rear region, and eject the straw residue through the rear of the machine either directly onto the ground in windrow or via a straw chopper (not shown). A concaved grate 22 in the underside of the threshing and separating rotor 20 allows the separated material to fall by gravity onto a return pan 23 located below.

Although described in relation to an axial flow processor it should be understood that alternative processors known in the art may be employed instead. For example, a conventional, tangential flow, threshing cylinder with downstream straw walkers may replace the processor shown. In yet another alternatives, hybrid or transverse threshing technology may be employed.

Return pan 23 comprises a tray-like structure and serves to convey the collected grain forwardly (in the direction F) to a respective front edge thereof in a known manner. It should be understood that the term "pan" will be used for grain conveyance components which serve to convey grain in a given direction. This is in contrast to "sieves" which include a perforated structure to separate material and will be described in more detail below.

The single return pan 23 may be replaced by a dual return pan arrangement such as that described in WO-2015/062965 for example. Alternatively, a continuously driven belt may be employed.

At this stage in the process a mix of grain, kernels, chaff, un-threshed tailings and shorter straw have been separated from the majority of the straw residue, the separated mix having fallen through the concave or grate of processor 20 onto the return pan 23. The remaining straw residue 103 continues in a spiral path around the axial rotor 20 to the rear from where it is discharged onto the ground in a windrow 104.

The separated crop mix will hereinafter be referred to as a grain-MOG mix wherein MOG refers to Material Other than Grain and includes the straw and chaff.

The grain-MOG mix falls onto a grain pan 26 which will hereinafter be referred to as "stratification pan" 26 for reasons to become apparent below.

The stratification pan 26 is driven in a similar oscillating manner to the return pan, that is in a fore-and-aft oscillating motion which may be linear or partly circular. The stratification pan floor is transversely corrugated, or rippled, with a saw-toothed profile. The combination of the saw-toothed profile with the oscillating motion conveys the grain-MOG mix in a generally rearward direction towards a rear edge 27 from where the mix falls onto the front of a top sieve or chaffer 30.

As the grain-MOG mix falls from the stratification pan rear edge it is subjected to a cleaning airstream generated by fan unit 32 which includes a cross-flow fan in a fan housing. Alternatively, a centrifugal fan may be employed. Ducting 34 directs the pressurised air under the rear edge 27, the airstream serving to blow the MOG upwardly and rearwardly towards the rear of the machine. This process will be described in more detail later on.

Chaffer 30 comprises adjustable louvres supported on a chaffer frame which is driven in fore-and-aft oscillating manner. The material which settles on the chaffer 30 is conveyed in a generally rearward direction and the heavier smaller grain-rich material passes between the louvres onto an underlying lower sieve 38, whereas the lighter larger material passes to the end of the chaffer and out of the rear of the machine at 40. A rear section of chaffer 30a may be independently adjustable and is configured to allow un-threshed tailings to pass therethrough into a re-threshing region 42 from where the tailings are conveyed to a re-threshing auger 44.

Lower sieve 38 is also driven in an oscillating manner to convey the collected grain-MOG mix rearwardly wherein the material falling therethrough is collected in a clean grain trough 46 for conveyance by an elevator (not shown) to a grain tank 48. Material which does not pass through lower sieve 38 and is instead conveyed off the rear edge thereof falls into re-threshing region 42 for subsequent re-threshing in accordance with known principles.

The airstream generated by fan unit 32 is also conveyed by ducting up through lower sieve 38 and chaffer 30 to encourage lifting of the MOG from the chaffer surface. For ease of reference hereinafter the chaffer 30, lower sieve 38, fan unit 32 will be collectively referred to as "the cleaning shoe 50". Moreover, the return pan 23 and stratification pan 26 will be referred to as "the crop material transfer system" which serves the purpose of transferring the material separated by the processor 20 to the cleaning shoe 50.

For completeness the combine 10 includes an unloading system which includes an unloading auger 54 shown in part in FIG. 1.

The above described operating principle of a combine harvester, and in particular the flow of crop material therethrough, is known in the art. The various inventive aspects relate to the crop material transfer system and especially to the construction and operation of stratification pan 26, these inventive aspects to be described below.

Stratification pan 26 serves to convey the collected grain-MOG mix in a rearward direction. During this conveyance it has been found advantageous to actively facilitate stratification of the different material types before reaching the rear edge 27 for presentation to the cleaning shoe 50. WO-2012/095239 discloses recognition of the advantages from enhanced stratification by depositing the material towards the front end of the pan 26. The action of conveyance itself serves to stratify the grain-MOG mix, wherein the heavier grain kernels work down to the bottom layer and the lighter MOG rises to the top layer. As the stratified material falls from the rear edge 27 the MOG already present on the top becomes airborne more easily without hindrance from the heavier grain, whereas the latter falls directly onto the chaffer 30 (optionally via a cascade pan) thus settling more efficiently with reduced grain bounce.

The inventive aspects follow on from this recognition and serve to encourage and facilitate stratification of the grain and MOG upstream of the cleaning shoe.

In accordance with one aspect of the invention the floor of the stratification pan has a width-wise profile that defines a plurality of troughs and ridges to separate the grain-MOG mix into a plurality of spaced discrete streams, each trough equating to a longitudinally-aligned channel. The ridge and trough profile becomes more pronounced in the direction of conveyance wherein the troughs or valleys get deeper whilst the ridges get higher.

This approach goes against the conventional thinking which aims for a uniform or flat width-wise distribution of the crop material at the point at which it is conveyed into the cleaning shoe 50. The inventive aspect involves the recognition that the escalating ridge and trough profile of the stratification pan serves to enhance stratification or effectively vertically stretch the material layers wherein the heavier grain is guided into the troughs and the lighter MOG on top is forced upwardly by the ridges. Therefore, when subjected to a cleaning airstream the MOG is rendered airborne more effectively.

The effect on the material flow is that a plurality of grain rich sub-streams cascade off of the rear edge 27 of the stratification pan 26. The cleaning airstream X passing under the rear edge 27 can pass between the grain-rich sub-streams in the gaps corresponding to the location of the ridges.

In accordance with a second inventive aspect pressurised air is directed in a rearward direction at a height above the pan floor. The upper MOG-rich material is engaged by the pressurised air whereas the grain-rich material is somewhat insulated from the effects of the airflow.

Both inventive aspects may be embodied together in a grain conveyance system wherein the ridges provided in the profile of the grain pan floor serve as nozzles and eject air on their rearward facing side. Advantageously, the ejected airflow engages immediately with the MOG-rich material lifted by the ridges. Conversely, the grain-rich material residing in the troughs is subjected to minimal airflow resulting in less grain loss.

These advantages will be understood more clearly from the following description of specific embodiments of the inventive aspects wherein like components will keep the same reference numbers throughout.

FIGS. 2 to 9 relate to, and illustrate, a stratification pan 126 having a design in accordance with a first embodiment of the invention.

The conveyance floor of stratification pan 126 has a rippled surface which encourages crop material rearwardly when oscillating. The conveyance floor includes a front generally planar portion 126a and a rear portion 126b. The rear portion 126b has a transverse floor profile which defines a plurality of ridges 160 and troughs 164 which increase in amplitude or height in the direction of conveyance, namely rearward.

Figure 2:
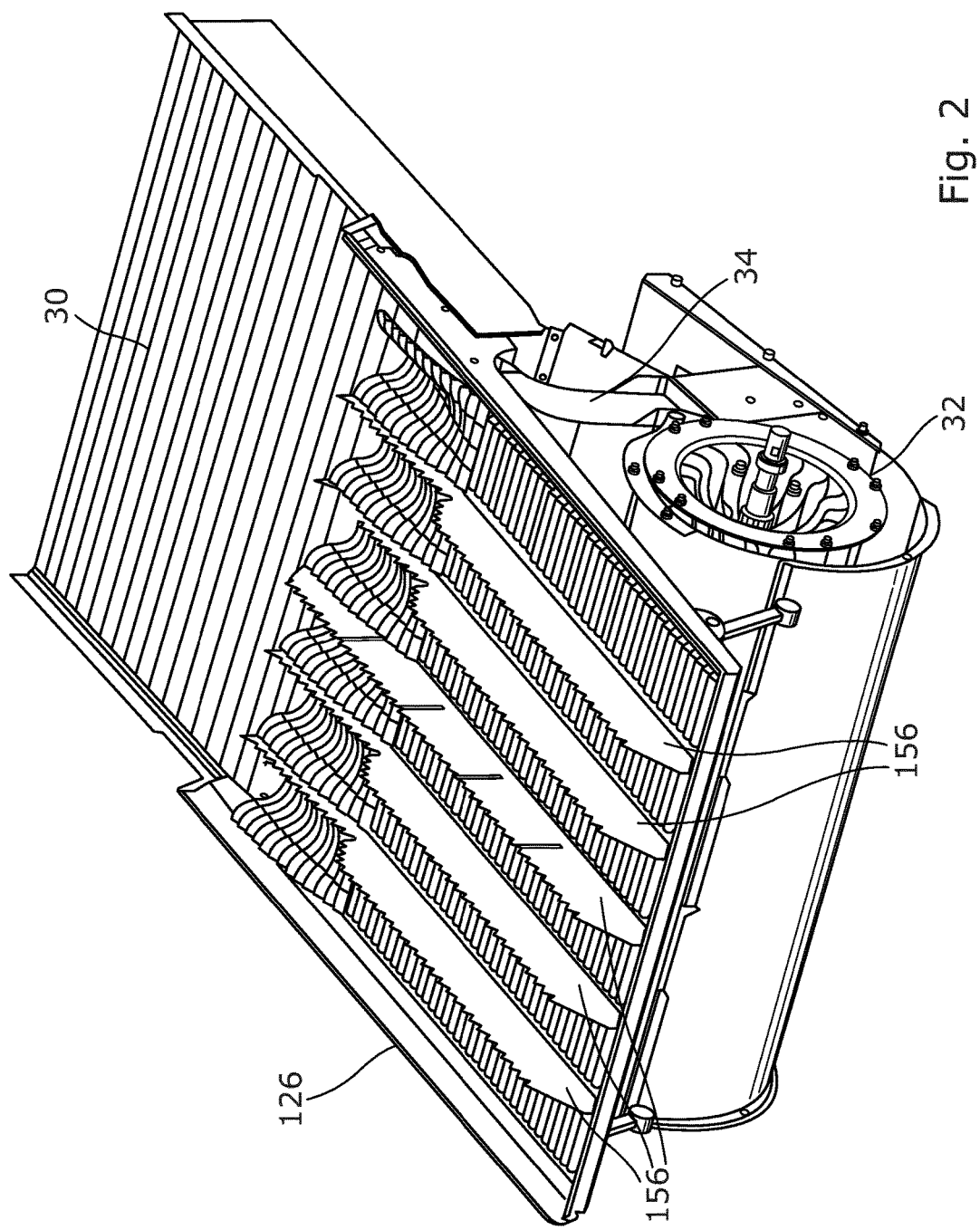
FIG. 2 is a front left perspective view of a crop material conveyance system and grain cleaning shoe of the harvester of FIG. 1 and in accordance with a first embodiment of the invention.
Figure 5:
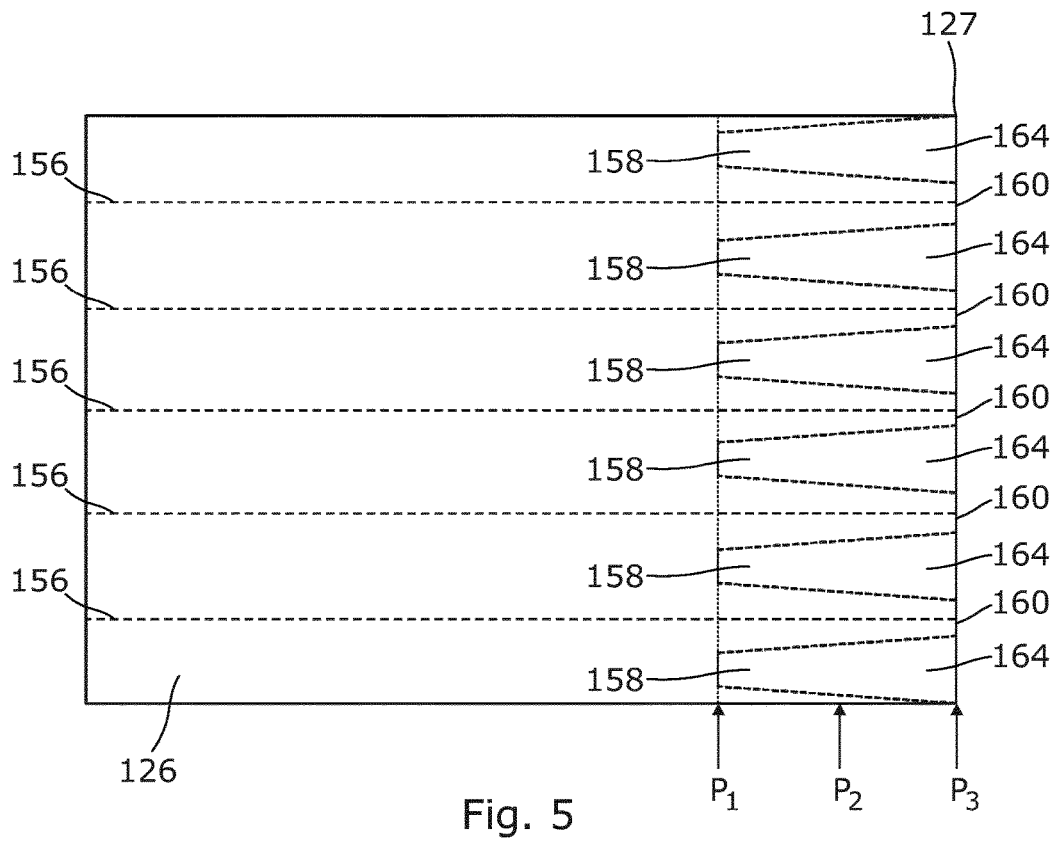
FIG. 5 is a top view of the grain pan of FIG. 2.

It is known to provide longitudinally aligned baffles or fins on the stratification pan 126 in a spaced manner to prevent the crop material moving to one side of the pan when working on hillsides and to maintain a substantially uniform loading across the width of the pan 126. Such longitudinal upstanding fins 156 are shown in FIGS. 2 and 5, the fins 156 comprising a saw-toothed profile cut into their upper edge. The saw-toothed profile serves to ensure rearward conveyance of the straw material which rests on top of the fins 156.

Best seen in FIG. 5, the ridges 160 are longitudinally aligned with the fins 156. The spaces between the fins 156 are longitudinally aligned with the troughs 164 wherein the troughs 164 provide mutually spaced longitudinal channels 158 along which the heavier grain-rich material is conveyed.

Figure 6:
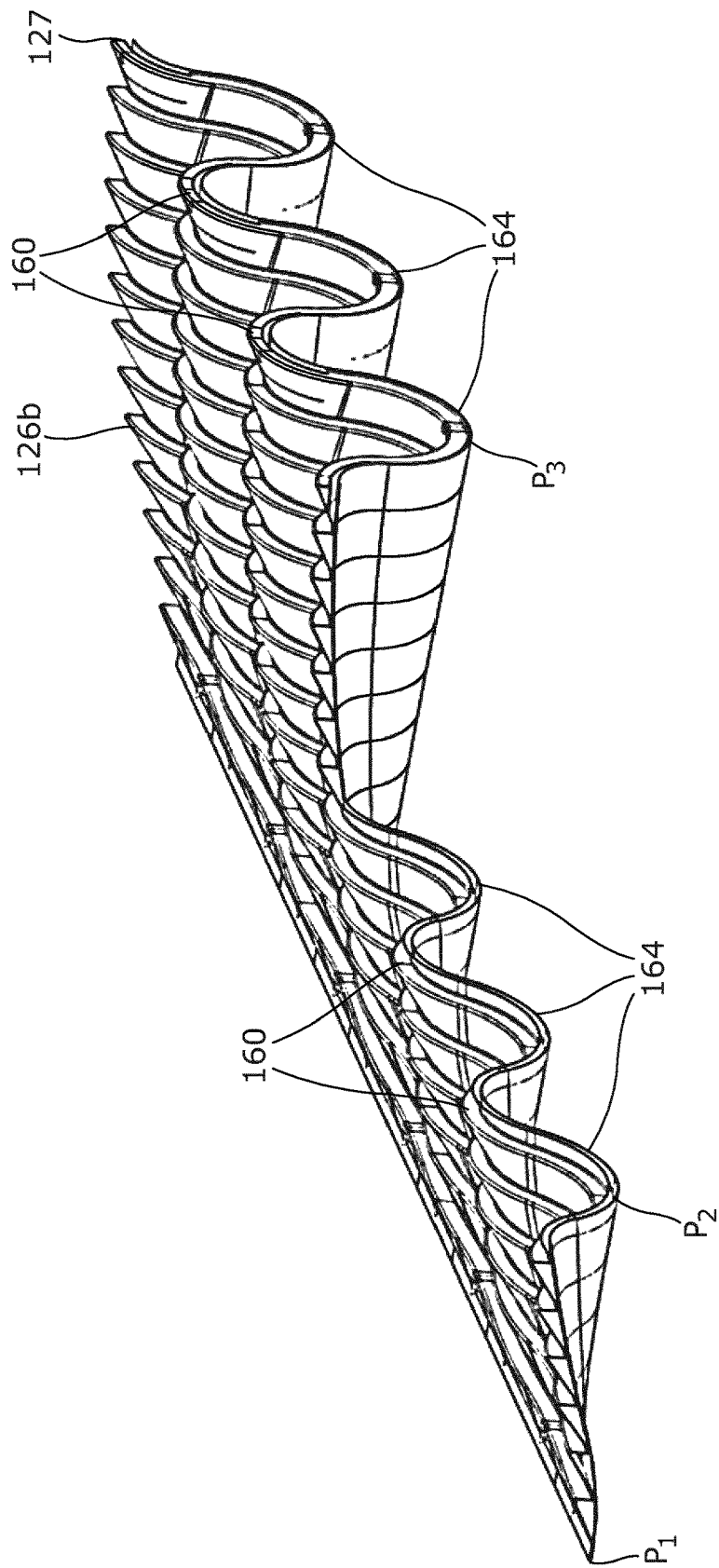
FIG. 6 is a close up view of the rear part of the grain pan of FIG. 3 shown with a quarter-section removed to reveal the transverse ridge-trough profile across an intermediate transverse (or lateral) section.

In this first embodiment the transverse ridge-trough profile is generally sinusoidal. FIG. 6 shows the rear conveyance floor section 126b with a portion cut away to reveal the ridge and trough profile at an intermediate position. At a longitudinal position $p_1$ (FIG. 5) corresponding to the front of the rear floor section 126b, the transverse profile of the conveyance floor is substantially flat, corresponding to the substantially planar profile of the front floor section 126a.

Figure 7:
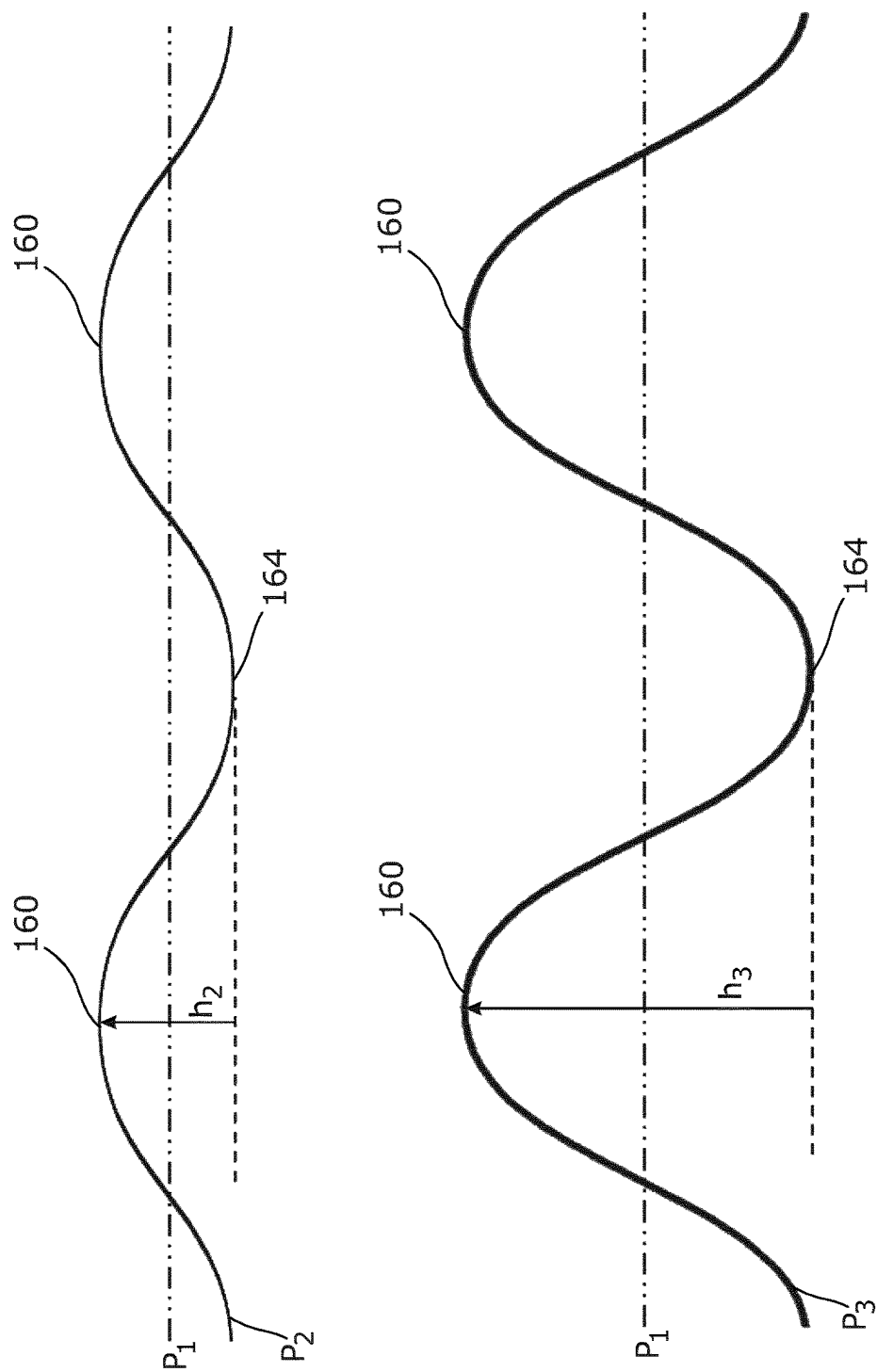
FIG. 7 is a schematic illustration of the transverse ridge-trough profile at the intermediate transverse section shown in FIG. 6 and at the rear edge.

In the direction of crop conveyance from transverse section $p_1$, the transverse profile takes on the sinusoidal profile with an increasing amplitude toward the rear edge 127. The transverse profiles at the intermediate position $p_2$ and at the rear edge $p_3$ are shown in FIG. 7 together with the flat transverse profile at position $p_1$. It can be seen that the ridge-to-trough height h increases in the direction of conveyance wherein the ridge-to-trough height $h_3$ at the rear edge $p_3$ is greater than the ridge-to-trough height $h_2$ at the intermediate position $p_2$. In this embodiment, the ridge-to-trough height increased continuously from position $p_1$ to the rear edge 127.

It can also be seen from FIG. 7 that the channels 158 defined by the troughs 164 slope downwardly with respect to the front floor portion 126a, whereas the ridges 160 slope upwardly. In this embodiment the ridge-to-trough height h is greatest along the rear edge 127. However, it should be understood that the ridge-to-trough height h may alternatively be at its greatest at a position displaced forward of the rear edge.

Figure 9:
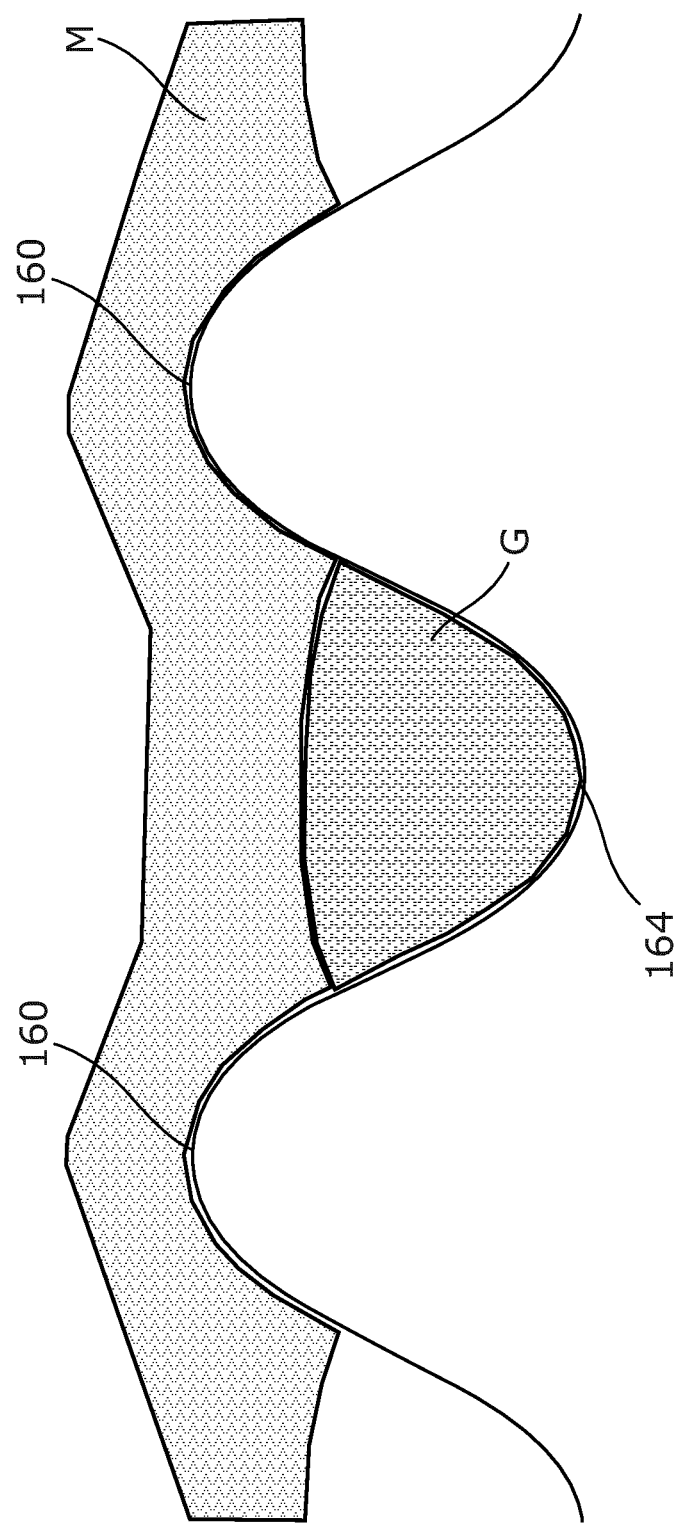
FIG. 9 is a schematic rear view of part of the grain pan of FIG. 3 showing the distribution of grain-rich and MOG-rich material during use.

With reference to FIG. 9, the grain-rich material 'G' settles into the base of the troughs 164 whilst the MOG-rich material 'M' engages the surface of the ridges 160 and is forced upwardly. As such, the ridge and trough structure encourages vertical separation, or stratification, of the grain and the MOG.

As mentioned above a portion of the cleaning airstream generated by fan unit 32 is directed under the rear edge 127. This is represented schematically by arrows X in FIGS. 4 and 8. The profile of the conveyance floor is mimicked on its underside so that the ridges 160 effectively provide airflow guidance channels in the underside of the stratification pan. The hollow ridges 160 effectively provide a plurality of upstanding nozzles disposed on the grain pan 126 in accordance with the second aspect of the invention, the nozzles directing pressurised air X in a rearward direction at a height above the pan floor.

In other words a cleaning airstream X is directed through the hollow space under the ridges 160, this airstream X impacting predominately the MOG-rich material M lifted by the ridges 160. Conversely, the grain-rich material G falling from the channels 158 is exposed to less of the cleaning airstream thus reducing the rearward propulsion of the grain and minimizing grain bounce on the chaffer and reducing loss.

Figure 8:
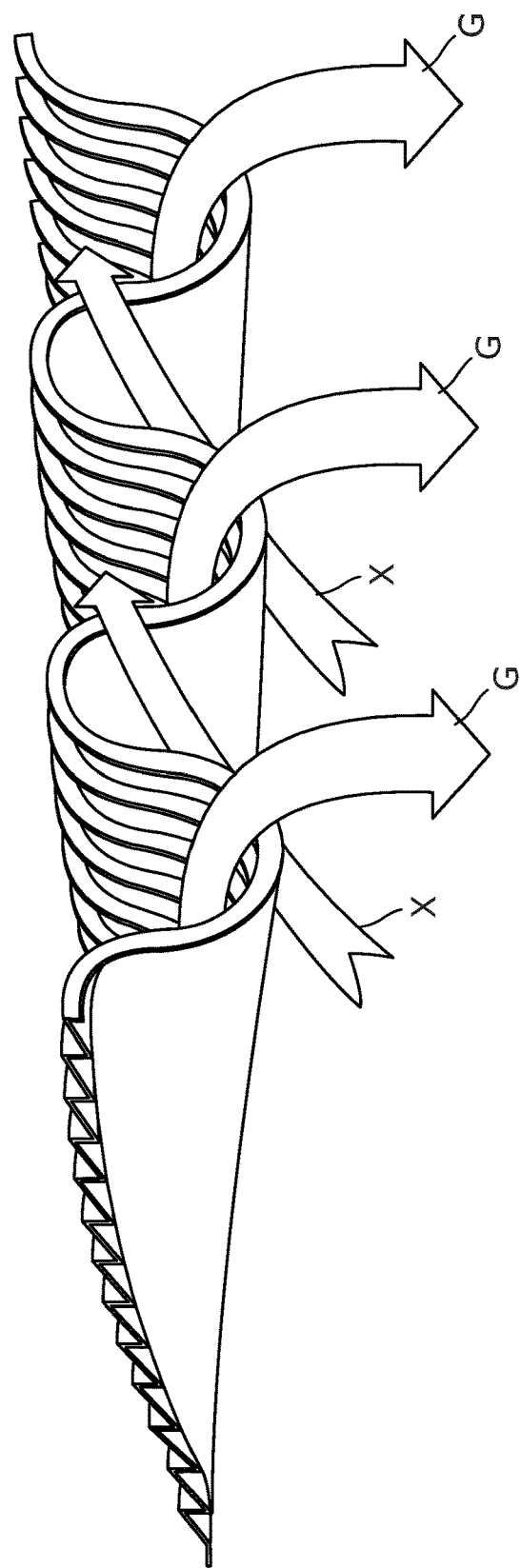
FIG. 8 is a close up view of part of the rear part of the grain pan of FIG. 3 showing the flow of grain-rich material and cleaning airflow.

The nozzles formed inside, or by, the ridges 160 vent pressurised air at a height which is above the majority of the grain that resides in the base of the adjacent troughs. Therefore, taking a transverse vertical view of the rear section 126b, for example as shown in FIG. 8, the ridge and trough profile causes a portion of the pressurised air X to exit the nozzle above the base of the adjacent trough 164. Less grain is, therefore, engaged by the cleaning airstream thus encouraging the grain to settle on the chaffer 30.

Flexible ducting may be provided between the underside of stratification pan 126 and fan unit 32. However, such flexible ducting is optional as the basic ridge and trough profile itself guides the airstream in a targeted manner towards the lighter MOG M. Fixed ducting 34 directs air from the outlet of fan unit 32 toward the underside of stratification pan 126 at a rear region thereof.

Figure 10:
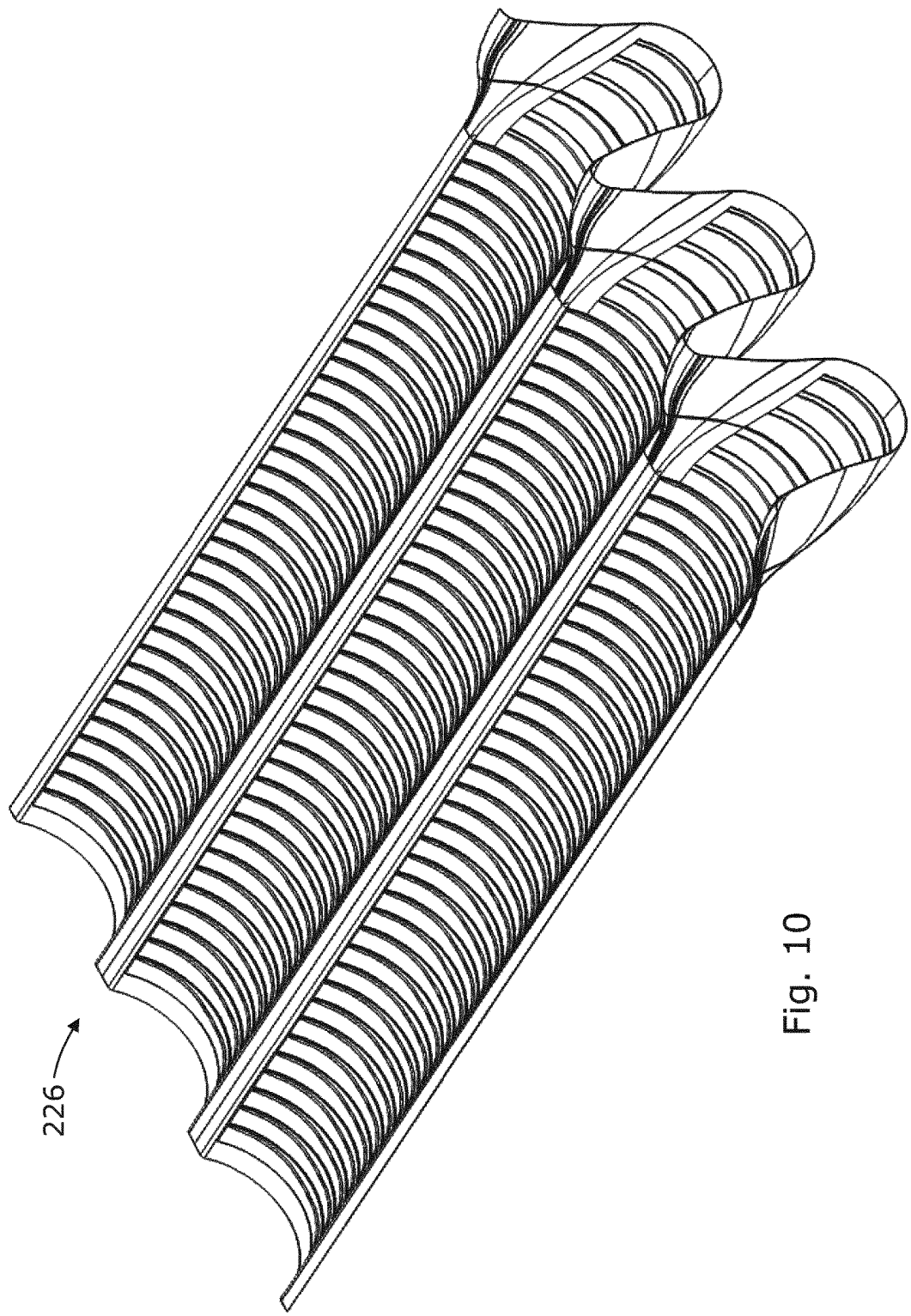
FIG. 10 is a rear perspective view of a grain pan in accordance with a second embodiment of the invention.
Figure 11:
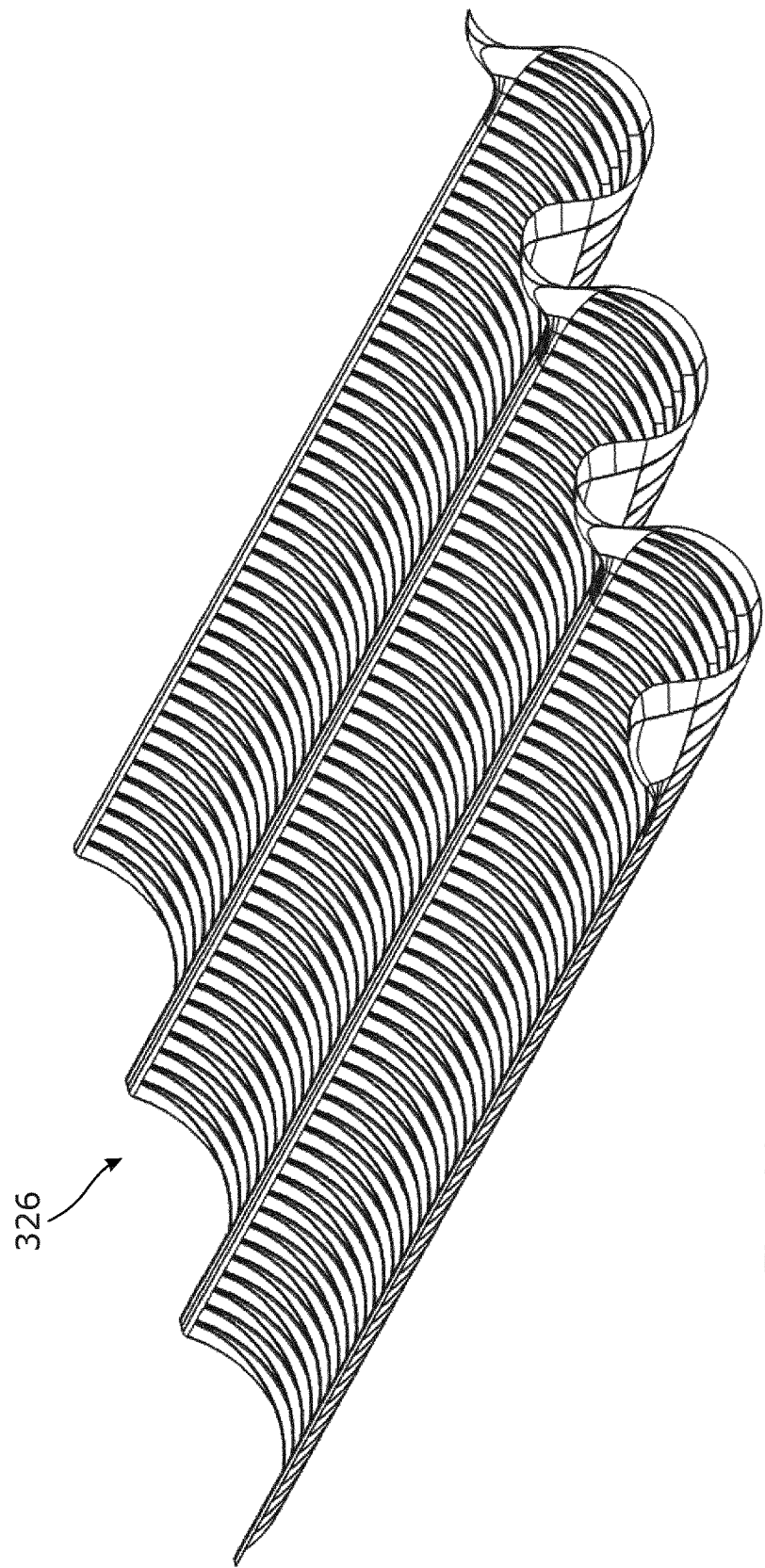
FIG. 11 is a rear perspective view of a grain pan in accordance with a third embodiment of the invention.

FIGS. 10 and 11 illustrate second and third embodiments of the inventive aspects and show stratification pans 226,326 having different trough and ridge profiles at the rear edge thereof, the profiles becoming more pronounced in the direction of conveyance. Both designs include a plurality of curved gullies extending from front to rear and embody the principles of the invention as described above.

Figure 12:
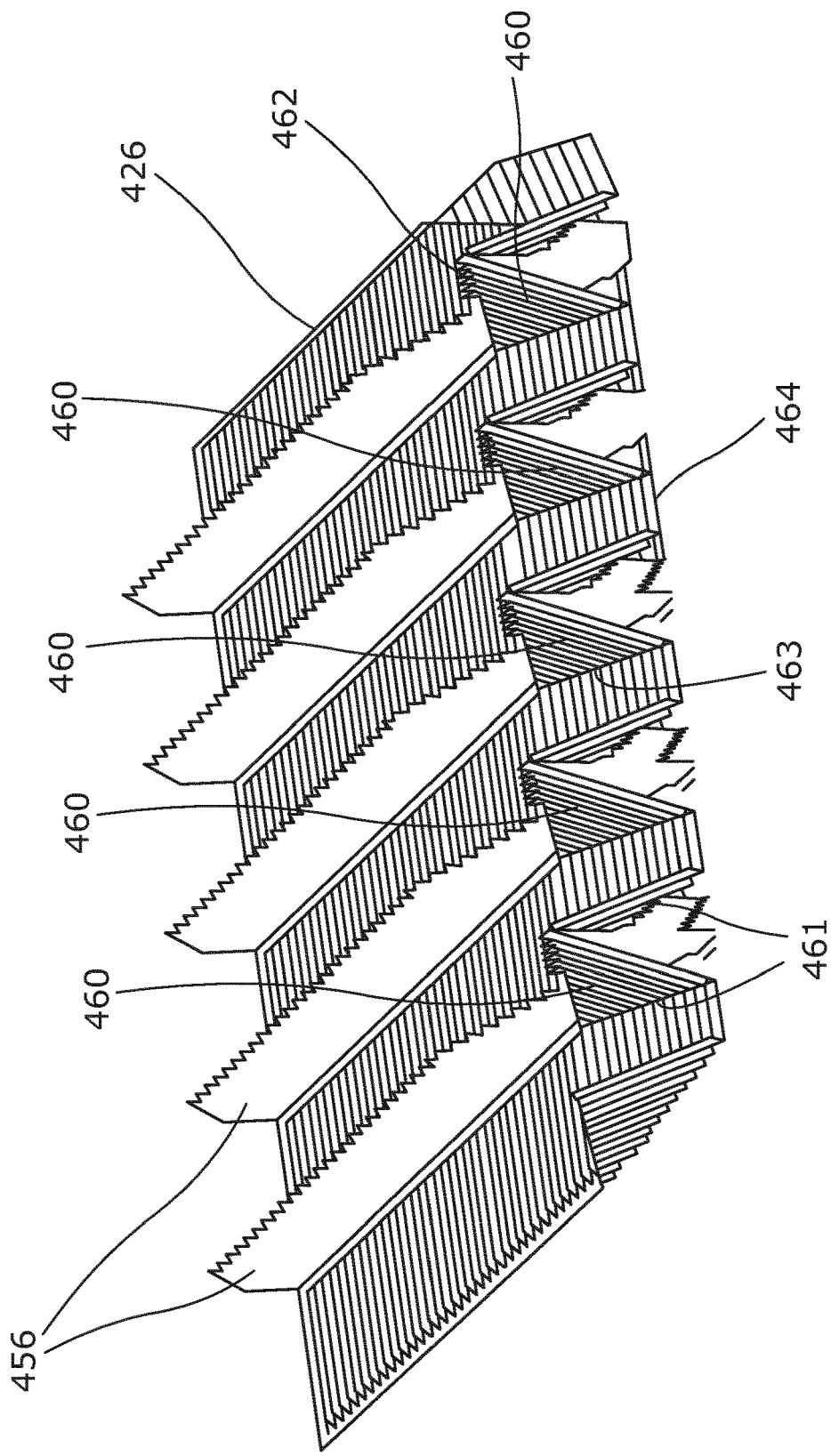
FIG. 12 is a rear perspective view of a grain pan in accordance with a fourth embodiment of the invention.

In a fourth embodiment illustrated in FIG. 12 a set of ridges in the form of tetrahedron shaped ramps 460 are provided in a spaced relationship across the rear of stratification pan 426, the ramps 460 forming a row in the transverse direction. The tetrahedron shaped ramps 460 are simply formed by a pair of triangular shaped plates 461 which are fixed to the floor of pan 426 and abut one another along an edge aligned with fins 456, the edge 462 inclining upwardly in the direction of conveyance (in the rearward direction). The inclined edge 462 comprises a saw-toothed profile in a similar manner to that of fins 456 to facilitate conveyance of the material resting thereon.

Figure 13:
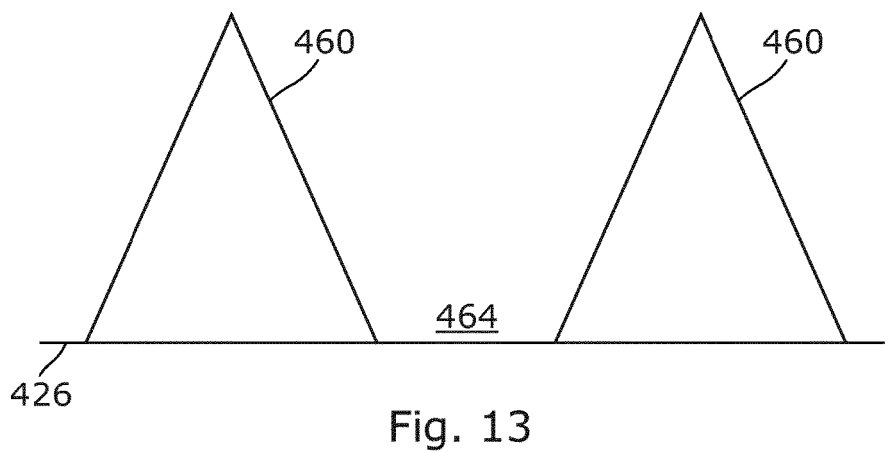
FIG. 13 is a schematic illustration of the transverse ridge-trough profile along the rear edge of the grain pan of FIG. 12.

In the direction of material conveyance the ramps 460 widen at the base 463 which has the effect of providing a narrowing channel or trough 464. The heavier grain-rich material which makes up the lower layers of the crop flow at this stage is funneled by the widening ramps into the narrowing channels 464. The upper MOG-rich layer of material is forced upwardly by the side walls 461 effectively vertically stretching the top lighter layers away from the bottom heavier layers. Ramps 460 may comprise a corrugated profile formed in their side walls 461 as illustrated in the drawings. The saw-toothed profile serves primarily for rearward and upward conveyance of the crop material. The transverse profile of the conveyance floor along the rear edge thereof is shown in FIG. 13.

Figures 14A, 14B:
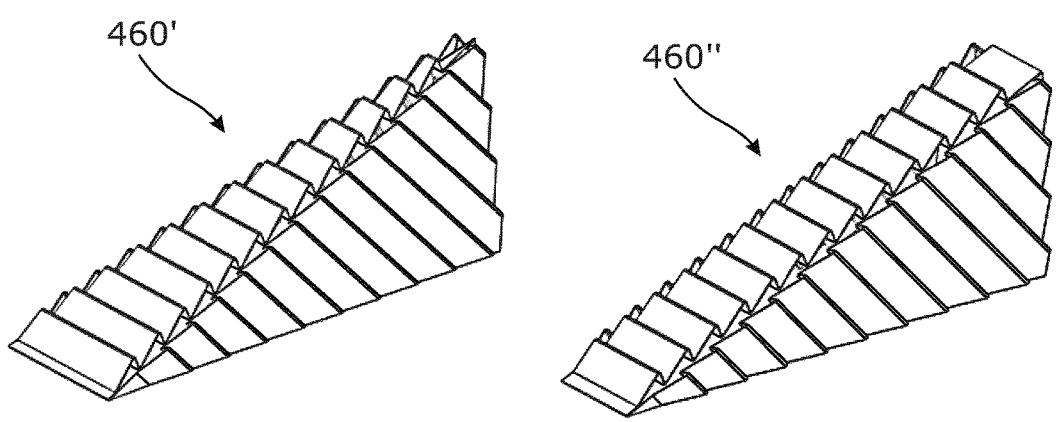
FIGS. 14A-C show alternative forms of ramp structure which may be employed on a grain pan in accordance with the inventive aspects.
Figure 14C:
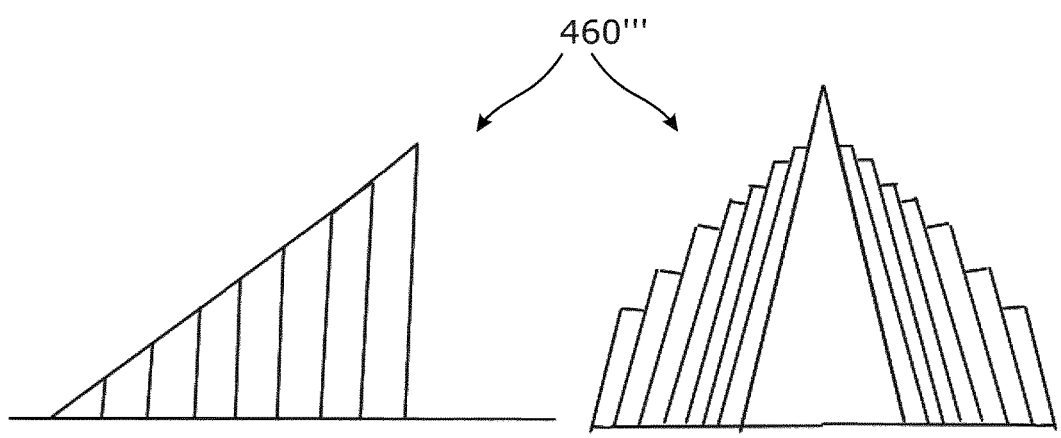

FIGS. 14A-C illustrate alternative ramp structures 460', 460", 460''' respectively which may replace the tetrahedron shaped structures 460 described above.

In an alternative not illustrated embodiment, vents may be formed by cut-outs in the rearward facing portions of the saw-tooth profile in the sidewalls 461, the vents providing a further rearward directed cleaning airstream to lift the lighter material.

Figure 15A:
FIGS. 15A-G show alternative profiles which can be embodied in the grain pan floor in accordance with aspects of the present invention.
Figure 15B:
Figure 15C:
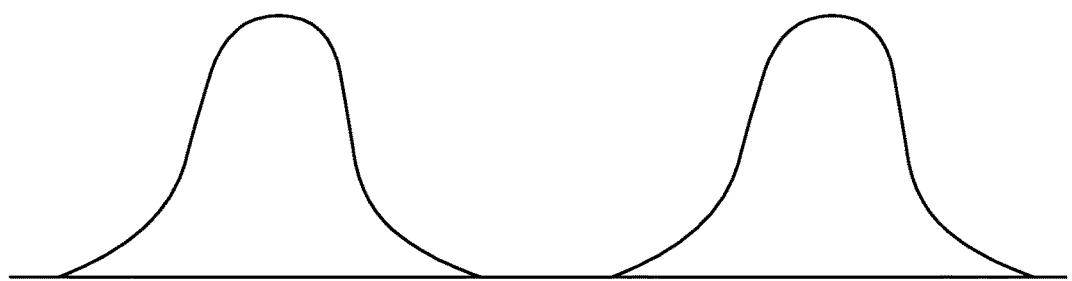
Figure 15D:
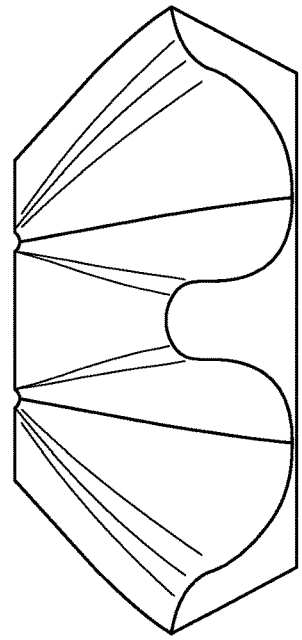
Figure 15E:
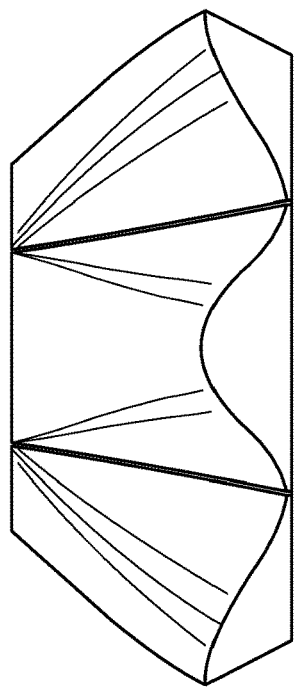
Figure 15F:
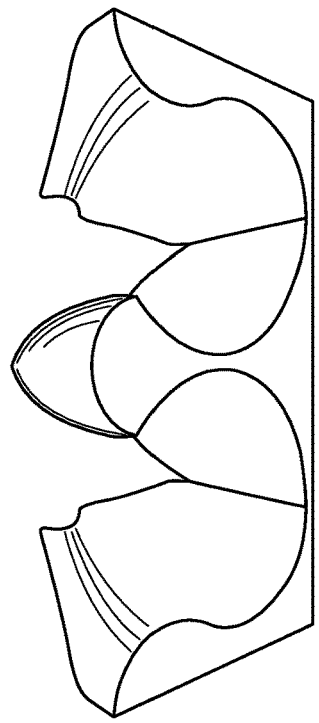
Figure 15G:
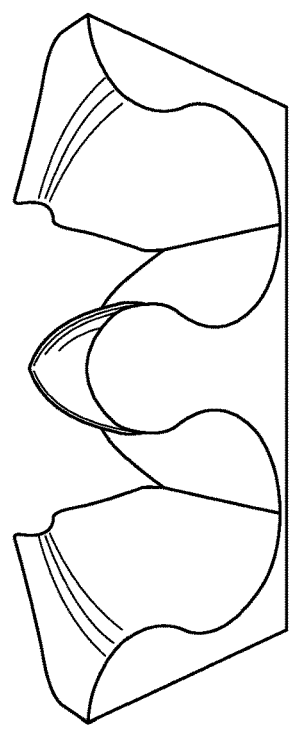

FIGS. 15A-15G illustrate alternative ridge and trough profiles that may be embodied in a grain conveyance system in accordance with the inventive aspects. The profiles are self-evident from the illustrations and a detailed description of each is not deemed necessary. FIGS. 15D and 15E each illustrate examples of a trough profile that is generally part-conical wherein the troughs deepen and widen in the direction of conveyance whereas the crest of the ridges narrow. FIGS. 15F and 15G both illustrate examples of a ridge profile that increases in width in the upward direction, or overhangs the neighbouring troughs. In particular, FIG. 15F shows a ridge profile that is generally omega-shaped.

Figures 18A, 18B:
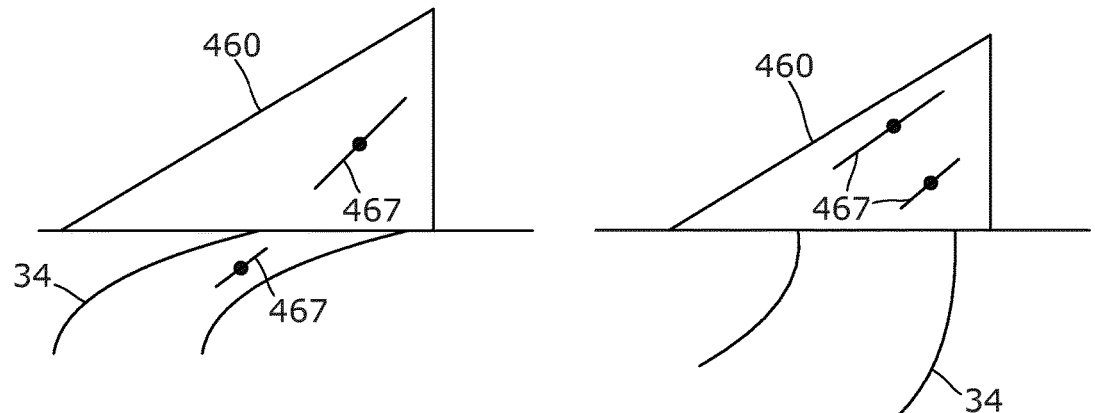
FIGS. 18A and 18B show highly schematic side sectional views of example connections between air ducting and the nozzles in accordance with aspects of the invention, and including deflectors arranged therein.
Figure 19:
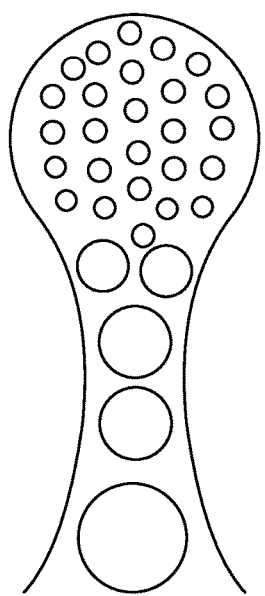
FIG. 19 shows a schematic rear view of an example vent arrangement embodied in an upstanding nozzle/ridge in accordance with an embodiment of the invention.

FIGS. 18A and 18B illustrate, schematically, baffles 467 inside the ducting 34 and/or ramps 460 which serve to adapt the exit profile of the airstream. In a preferred configuration the airstream has a higher velocity towards the top of the nozzle to engage the MOG-rich material. It should be appreciated that the baffles are optional and may be omitted. The exit profile of the airstream may be adapted by the use of a vent pattern provided in the rear side of the nozzle. FIG. 19 illustrates an example of such a vent pattern that is provided in the rear face of a bulbous-shaped ridge. The shape of the ridge itself together with the vent pattern provides an airstream which has a higher velocity towards the top.

Figure 16:
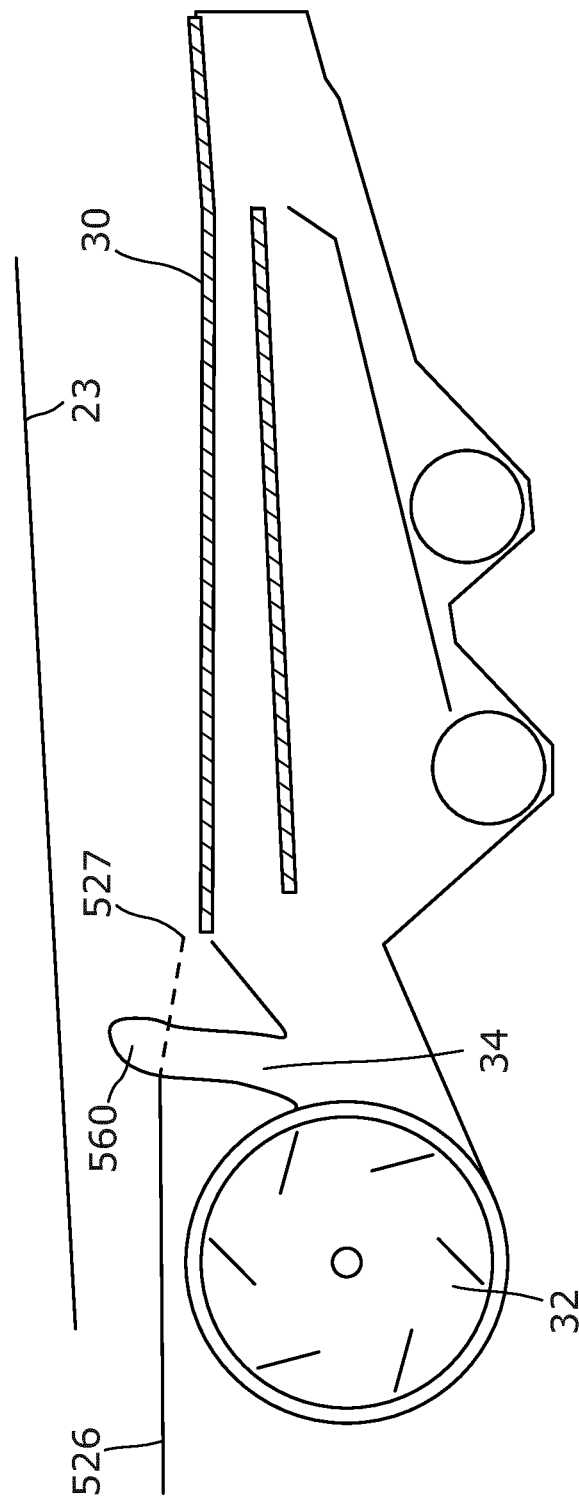
FIG. 16 is a schematic longitudinal vertical section, viewed from the left hand side, of a crop material conveyance system in accordance with a fifth embodiment of the invention.
Figure 17:
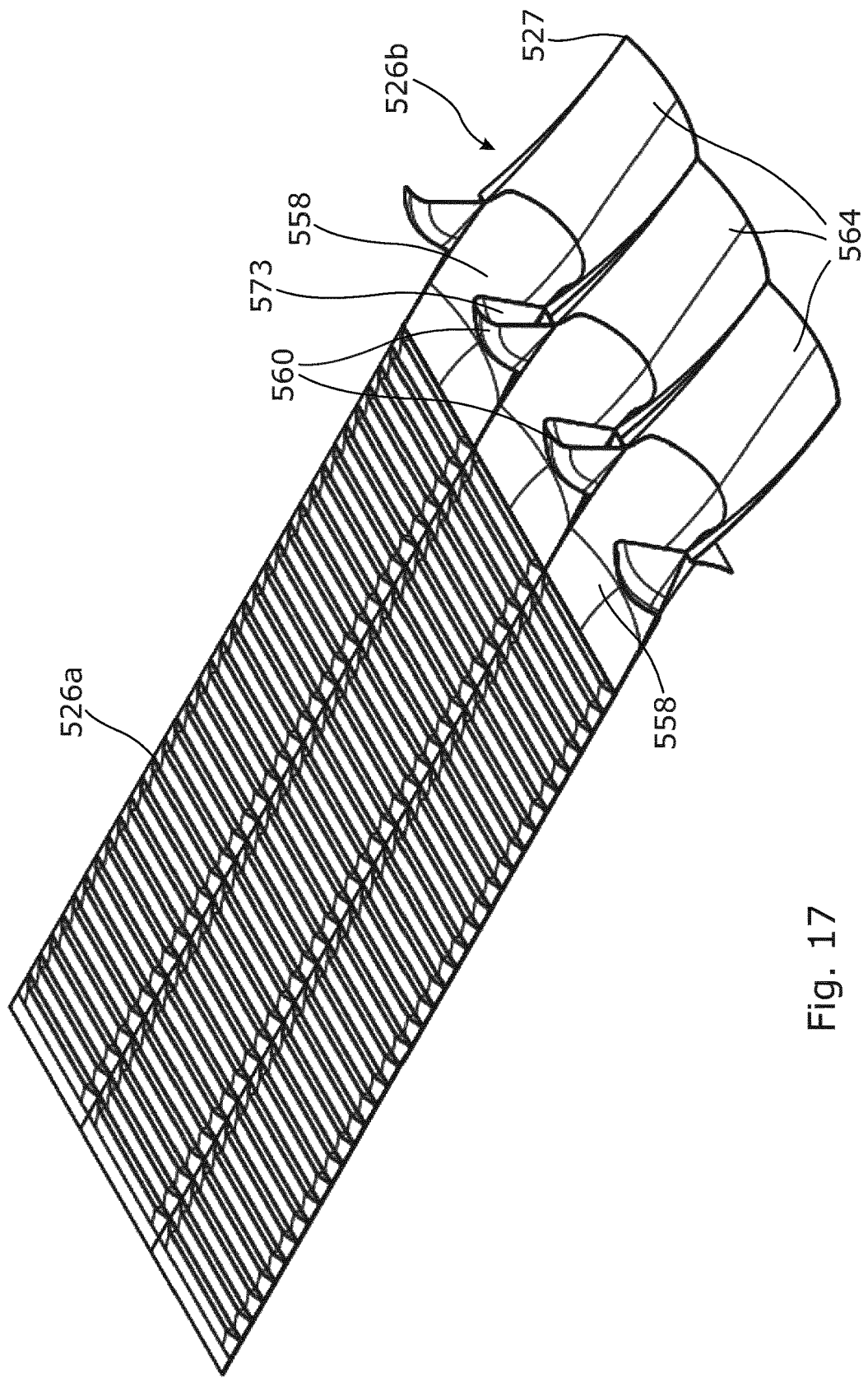
FIG. 17 is a rear perspective view of a grain pan included in the system of FIG. 16.

A fifth embodiment of the inventive aspects is illustrated in FIGS. 16 and 17. Stratification pan 526 comprises a rear edge 527 having a curved profile with curved troughs 564 and ridges 560 in between. The pan 526 includes a generally planar front portion 526a and a profiled rear portion 526b. Front portion 526a is transversely corrugated with a saw-toothed profile in a similar manner to the embodiments described above.

The floor of rear portion 526b has a transverse profile that defines a plurality of curved channels or gullies corresponding to the troughs 564 in the profile of the rear edge 527. Adjacent gullies 558 are separated by respective ridges 560 which have formed therein an upstanding nozzle each having a rearward facing vent 573. It should be understood that in this embodiment although distanced from the rear edge 527 the nozzles 560 serve also as ramps or ridges which lift the MOG, albeit to a lesser extent than the ridges 160 described above. Moreover, the nozzles function as disturbing elements that impact, through the oscillating motion, upon the crop material flow resulting in enhanced upstream stratification on the pan. The pan floor defines a profile of escalating troughs and ridges which includes the nozzles.

The curved gullies 558 funnel the heavier grain-rich material into a plurality of spaced sub-streams each centred on a respective trough 564 on the rear edge 527. The side walls of the gullies 558 are substantially circular in profile in a bottom region and taper inwardly with respect to vertical in an upper part of the profile, the tapering in this example being provided by the outwardly inclined side walls of nozzles 560. The inward tapering or overhang of the gully profiles has been found to advantageously affect the stratification process explained at least in part by the heavier grain being retained in the lower layers even during the vigorous oscillating motion of the pan 526. This effect is also produced by the ridge and trough profiles shown in FIGS. 15F and 15G.

Although shown with straight tapering side walls, it should be understood that the transverse section profile of the gullies 558 may vary in many different ways whilst still embodying this feature of inward tapering or overhang away from a vertical plane.

The open front sides of the nozzles defined by ridges 560 provide a rearward facing vent 573 which directs pressurised air rearwardly and engages a MOG-rich portion of the crop material. As with the embodiment described above, flexible ducting may be provided from the fan 32 to the individual nozzles through the base of the stratification pan 526.

In a preferred arrangement, the nozzles are provided with internal baffles (not shown) which generate a higher velocity exit airstream in a top part of the vent 573 and a lower velocity exit airstream in a lower part of vent 573. It is recognised that the higher layers in the stratified crop flow have a lower grain content and so a higher cleaning airstream velocity can be employed at greater heights without adversely affecting grain loss.

The floor of stratification pan 526a located forwardly of the nozzles 160 may be formed from a different component to the remainder of the stratification pan 526b. The front portion 526a may be moulded from plastic for example. However, it is envisaged that the entire stratification pan 526 may be formed from a single component or indeed more than two.

It should be noted that the grain pan floor in rear section 526b slopes downwardly so that the grain rich material is funneled through the gullies 558 and simultaneously aided by gravity in addition to the oscillation motion. However, it is envisaged that the troughs may instead be horizontal or slope upwardly without departing from the scope of the invention.

The embodiment of FIGS. 16 and 17 lends itself particularly well to a crop material transfer system having no cascade pan wherein the grain-MOG mix is passed directly from the stratification pan 526 onto the chaffer 30.

Figure 20:
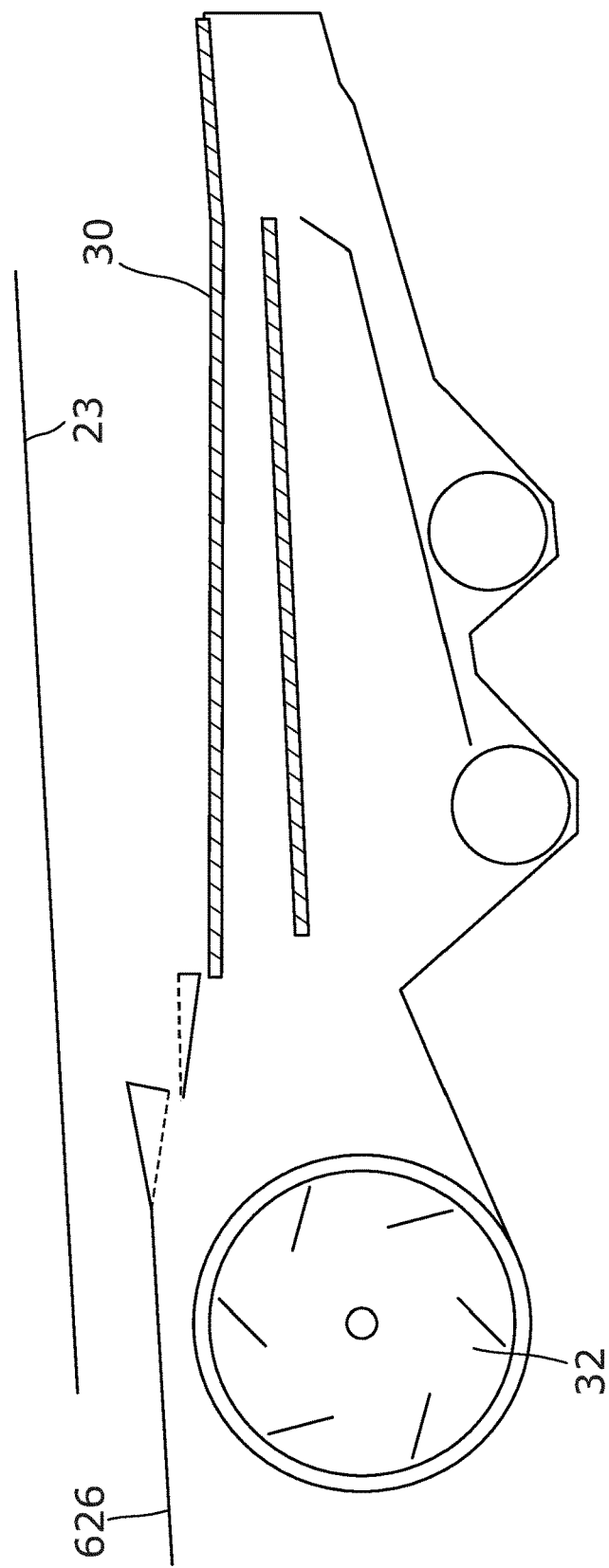
FIG. 20 is a schematic longitudinal vertical section, viewed from the left hand side, of a crop material conveyance system in accordance with a sixth embodiment of the invention including a cascade pan.
Figure 21:
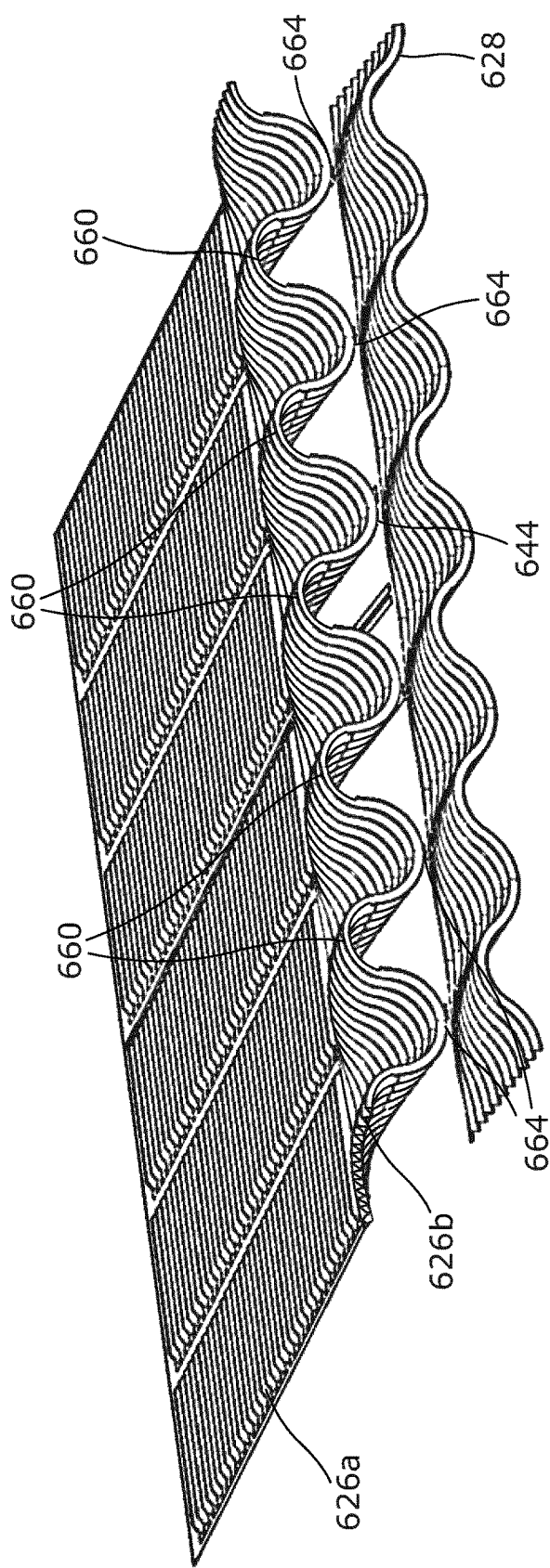
FIG. 21 is a rear perspective view of the stratification pan and cascade pan included in the conveyance system of FIG. 20; and, FIG. 22 is a rear view of the stratification pan and cascade pan of FIG. 21.
Figure 22:
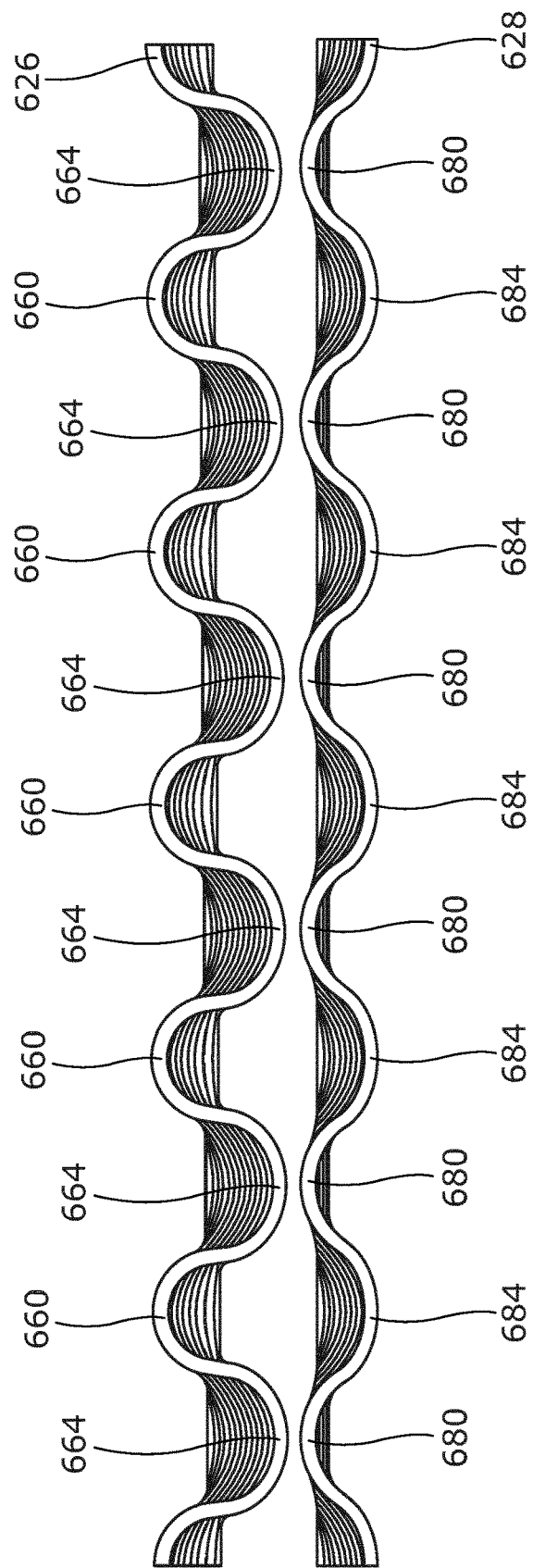

The embodiments described herein above may additionally comprise a cascade pan disposed between the stratification pan and the chaffer. FIGS. 20 to 22 show a crop material conveyance system in accordance with a sixth embodiment and which includes a cascade pan 628.

Figure 3:
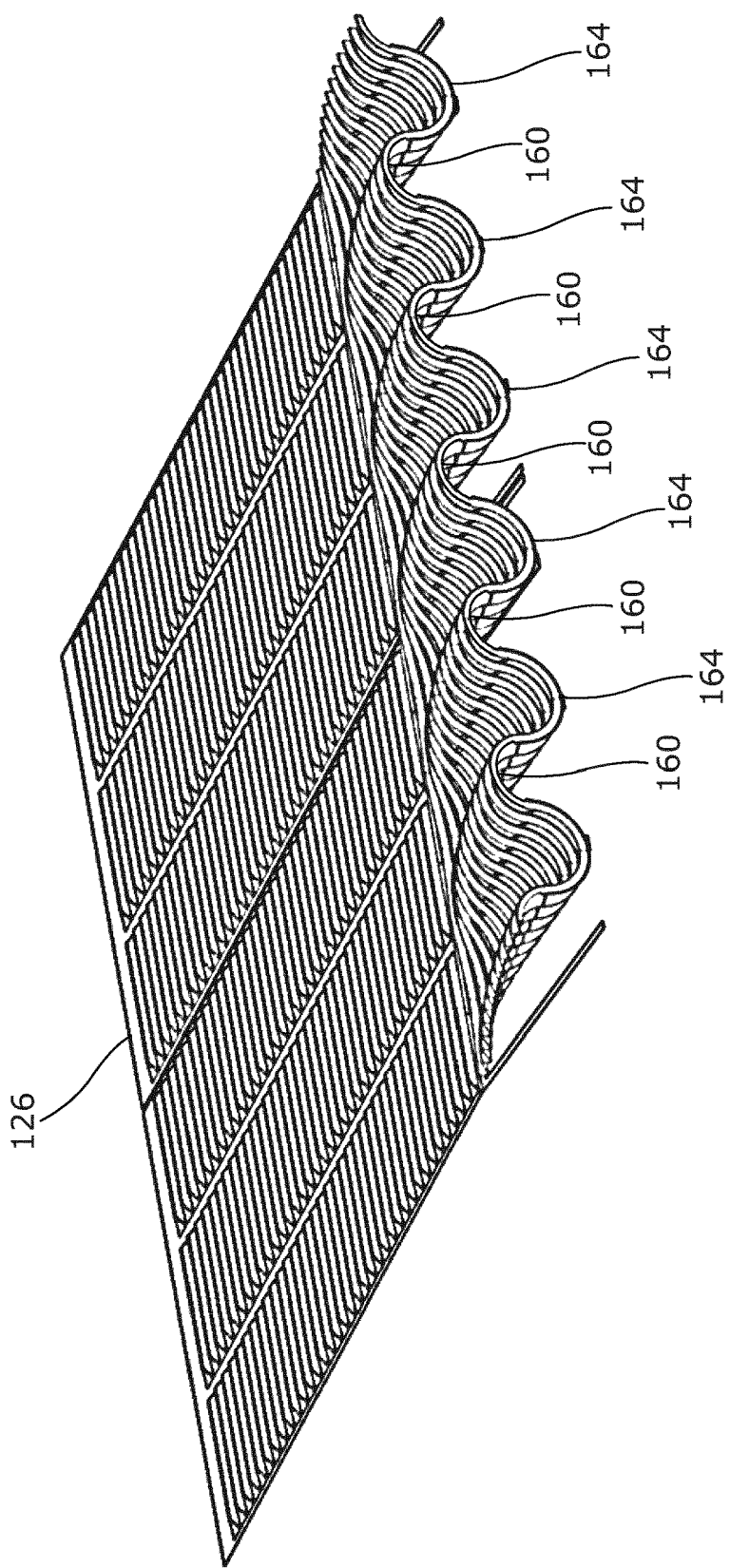
FIG. 3 is a close up view of the rear part of the grain pan included in the conveyance system of FIG. 2, the grain pan shown in isolation.
Figure 4:
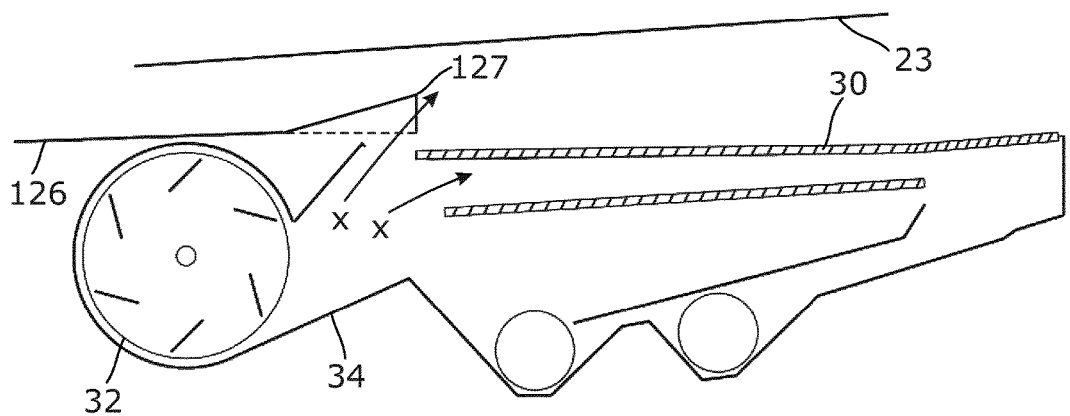
FIG. 4 is a schematic longitudinal vertical section, viewed from the left hand side, of the crop material conveyance system and cleaning shoe of FIG. 2.

The stratification pan 626 has a similar construction and profile to that shown in FIG. 3 and described above. A rear portion 626b of the stratification pan has a rippled conveyance floor that has a sinusoidal transverse profile that defines a plurality of ridges 660 and troughs 664 having an increasing amplitude in the direction of conveyance.

The cascade pan 628 also comprises a rippled conveyance floor with a floor profile which defines a plurality of ridges 680 and troughs 684. Although not essential, the ridge to trough height may increase in the direction of conveyance resulting in the greatest ridge to trough vertical separation being located along the rear edge 629 of the cascade pan 628.

It should be appreciated that the respective transverse ridge-trough profiles of the stratification pan 626 and cascade pan 628 need not be similar.

The ridges 660 of the stratification pan 626 in this embodiment are longitudinally aligned with the troughs 684 of the cascade pan 628. By having the troughs 664 of the stratification pan 626 aligned with the ridges 680 of the cascade pan 628 the grain-rich material from the stratification pan 626 is incident upon the ridges 680 of the cascade pan 628 leading to an additional step of stratification, wherein the grain trickles down into the troughs of the cascade pan 628 whilst the MOG remains on the ridges 680.

In summary there is provided a combine harvester comprising a grain pan arranged to catch a crop stream, the grain pan being driven in an oscillating manner to convey the crop stream rearwardly to a rear edge. A cleaning unit comprises a fan for generating a cleaning airstream which is directed under the rear edge. The grain pan comprises a floor profile which defines a transverse profile comprising ridges and troughs. The troughs provide a plurality of longitudinal channels, wherein the ridge-to-trough height increases in the direction of conveyance. Crop material conveyed by the grain pan experiences channels that narrow and/or deepen towards the rear edge of the pan.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure.

More than one inventive aspect is disclosed hereinabove, illustrated in a number of example embodiments. It should be readily appreciated that these separate inventive aspects may be adopted in isolation or in combination.

The invention claimed is:

1. A combine harvester comprising:
a grain pan arranged to catch a crop stream, the grain pan being driven in an oscillating manner to convey the crop stream rearwardly to a rear edge;
a cleaning unit comprising a fan for generating a cleaning airstream which is directed under the rear edge;
the grain pan comprising a conveyance floor with a floor profile which defines a curved transverse profile comprising ridges and troughs, the troughs providing a plurality of longitudinal channels, wherein the ridge-to-trough height increases in a direction of conveyance.

2. The combine harvester according to claim 1, wherein the plurality of channels are mutually spaced in a row across the width of the grain pan.

3. The combine harvester according to claim 1, wherein the ridge-to-trough height is greatest adjacent the rear edge.

4. The combine harvester according to claim 1, wherein the ridge-to-trough height increases continuously in the direction of conveyance.

5. The combine harvester according to claim 1, wherein the plurality of channels have a curved profile at the rear edge of the grain pan.

6. The combine harvester according to claim 1, wherein the transverse profile is generally sinusoidal.

7. The combine harvester according to claim 1, wherein the transverse profile is provided in a rear portion of the floor profile, and wherein a front portion of the floor profile is substantially planar.

8. The combine harvester according to claim 1, wherein the longitudinal channels extend from a front edge of the grain pan to the rear edge.

9. The combine harvester according to claim 1, wherein the floor profile defines a plurality of ramps which provide said ridges, the ramps having an increasing base width so as to define a narrowing channel and an increasing height in the direction of conveyance.

10. The combine harvester according to claim 1, wherein the ridges taper outwardly so as to overhang adjacent troughs.

11. The combine harvester according to claim 10, wherein the ridges comprise a generally omega-shaped profile.

12. The combine harvester according to claim 1, wherein the troughs may have a part-conical profile so as to present a deepening valley, with respect to the ridges, in the direction of conveyance.

13. The combine harvester according to claim 1, wherein the transverse profile of ridges and troughs is mimicked on the underside of the grain pan.

14. The combine harvester according to claim 1, wherein nozzles are formed inside the ridges, the nozzles configured to convey pressurised air from under the grain pan floor and to direct the air in a rearward direction.

15. The combine harvester according to claim 14, wherein the pressurised air is generated by the fan.

16. The combine harvester according to claim 14, wherein baffles are provided inside the ridges and configured to create zones of higher velocity airflow and zones of lower velocity airflow immediately behind the nozzles.

17. The combine harvester according to claim 14, wherein a rear face of each ridge is open to provide a nozzle vent.

18. The combine harvester according to claim 14, wherein each nozzle vents pressurised air above the conveyance floor forward of the grain pan rear edge.

19. The combine harvester according to claim 1, wherein side faces of the ridges comprise rearward facing vents to expel pressurized air.

20. The combine harvester according to claim 1, wherein the grain pan is a stratification pan and the combine harvester further comprises threshing and separating apparatus, and a return pan located under the threshing and separating apparatus so as to catch crop material falling therefrom and convey such forwardly to a front edge of the return pan, wherein the front edge is positioned above the stratification pan.

21. The combine harvester according to claim 1, wherein the grain pan is a cascade pan located downstream, below and rearward of a stratification pan, wherein the stratification pan is driven in an oscillating manner to convey the crop stream rearwardly to a respective rear edge of the stratification pan from where the crop stream falls onto the cascade pan.

22. The combine harvester according to claim 1, wherein the grain pan is configured as a stratification pan, and wherein the combine harvester further comprises a cascade pan arranged downstream, below and rearward of the stratification pan and configured to catch crop material falling from the rear edge of the stratification pan, and wherein the cascade pan comprises a respective conveyance floor with a floor profile which defines a transverse profile comprising ridges and troughs, the troughs of the cascade pan providing a plurality of longitudinal channels, wherein the ridge-to-trough height increases in the direction of conveyance.

23. The combine harvester according to claim 22, wherein the transverse ridge and trough profile of the stratification pan is substantially equal to the transverse ridge and trough profile of the cascade pan.

24. The combine harvester according to claim 23, wherein the ridges of the stratification pan are longitudinally aligned with the troughs of the cascade pan.

25. The combine harvester according to claim 1, wherein top faces of the ridges comprise rearward facing vents to expel pressurized air.

* * * * *